US007281210B2

(12) United States Patent
Ohashi et al.

(10) Patent No.: US 7,281,210 B2
(45) Date of Patent: Oct. 9, 2007

(54) LAYOUT SYSTEM, LAYOUT PROGRAM, AND LAYOUT METHOD

(75) Inventors: Hirotaka Ohashi, Suwa (JP); Atsushi Nagahara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 402 days.

(21) Appl. No.: 10/795,399

(22) Filed: Mar. 9, 2004

(65) Prior Publication Data
US 2004/0225961 A1 Nov. 11, 2004

(30) Foreign Application Priority Data

Mar. 12, 2003 (JP) .............................. 2003-067058
Dec. 26, 2003 (JP) .............................. 2003-434179

(51) Int. Cl.
*G06F 3/00* (2006.01)

(52) U.S. Cl. ...................... 715/521; 715/517; 715/518; 715/520; 715/526

(58) Field of Classification Search ................ 715/515, 715/517, 518, 520, 521, 523, 526
See application file for complete search history.

(56) References Cited

U.S. PATENT DOCUMENTS

| | | | | |
|---|---|---|---|---|
| 5,926,825 A | * | 7/1999 | Shirakawa | 715/521 |
| 6,026,417 A | * | 2/2000 | Ross et al. | 715/517 |
| 6,081,816 A | * | 6/2000 | Agrawal | 715/521 |
| 6,510,441 B1 | * | 1/2003 | Kenninga | 715/521 |
| 6,647,533 B1 | * | 11/2003 | Liu et al. | 715/517 |
| 6,880,122 B1 | * | 4/2005 | Lee et al. | 715/500 |
| 6,948,119 B1 | * | 9/2005 | Farmer et al. | 715/517 |
| 7,003,159 B2 | * | 2/2006 | Yamaai | 382/199 |
| 7,010,745 B1 | * | 3/2006 | Shimada et al. | 715/517 |
| 7,043,689 B2 | * | 5/2006 | Linker et al. | 715/526 |
| 2004/0054630 A1 | * | 3/2004 | Ginter et al. | 705/53 |
| 2005/0177786 A1 | * | 8/2005 | Shade et al. | 715/518 |

FOREIGN PATENT DOCUMENTS

| | | |
|---|---|---|
| JP | A 05-089101 | 4/1993 |
| JP | A 10-154174 | 6/1998 |
| JP | A 2002-157238 | 5/2002 |
| JP | A 2002-297570 | 10/2002 |
| JP | A 2002-297571 | 10/2002 |
| JP | A 2002-297572 | 10/2002 |
| JP | A 2002-297573 | 10/2002 |

* cited by examiner

Primary Examiner—Stephen Hong
Assistant Examiner—Gregory J. Vaughn
(74) Attorney, Agent, or Firm—Oliff & Berridge, PLC

(57) ABSTRACT

To provide a layout system that prevents a layout intended by a designer from being destroyed, a content delivery terminal segments a selected information container frame into information container frames that do not overlap with another information container frame, registers the segmented information container frames into a modification candidate list, selects one of the segmented information container frames from the modification candidate list, and modifies the selected information container frame to the selected modification candidate container frame. Regardless of the content of an article, the amount of information of the article, and the logical structure of the article, the information container frame is modified in size with the rectangular shape thereof maintained.

2 Claims, 25 Drawing Sheets

300 USER PROFILE TABLE

| USER ID | DELIVERY ADDRESS | CATEGORY NO. | KEYWORD | DELIVERY DATE | DELIVERY TIME | LAYOUT NO. | MAXIMUM NUMBER OF PAGES | FONT SIZE |
|---|---|---|---|---|---|---|---|---|
| Andy | Andy@aaa.com | 1700 | PROCESSOR | EVERYDAY | 5 | 2 | 2 | SMALL |
| Bill | Bill@bbb.com | 1501 | OS | WEEKDAY | 11 | 5 | 2 | SMALL |
| Candy | Candy@ccc.com | 201* | APPLICATION | WEEKEND | 9 | 6 | u | STANDARD |

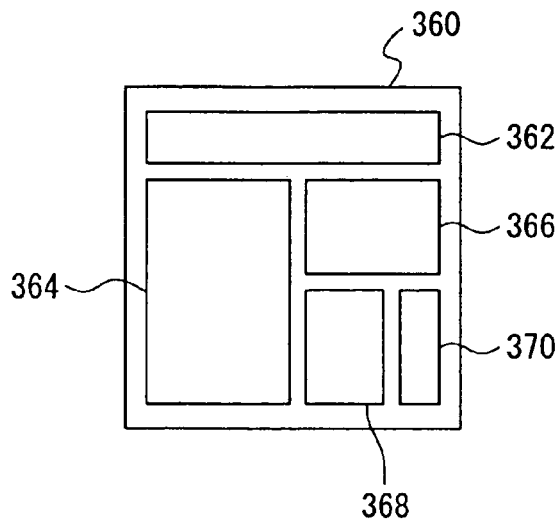

FIG. 5

```
<layout>

...
  <image>
    <position>
      <top>10</top>
      <left>50</left>
      <bottom>220</bottom>
      <right>250</right>
    </position>
    <resize>
      <min-width>40</min-width>
      <min-height>40</min-height>
      <max-area>10000</max-area>
      <method>
          <edge-priority>left, right, top</edge-priority>
      </method>
    </resize>
  </image>

</layout>
```

- 500 `<image>`
- 504 `<position>`
- 512 `<top>` 514 `</top>`
- 516 `<left>` 518 `</left>`
- 520 `<bottom>` 522 `</bottom>`
- 524 `<right>` 526 `</right>`
- 506 `</position>`
- 508 `<resize>`
- 528 `<min-width>` 530 `</min-width>`
- 528 `<min-height>` 530 `</min-height>`
- 528 `<max-area>` 530 `</max-area>`
- 532 `<method>`
- 534 `</method>`
- 510 `</resize>`
- 502 `</image>`

AREA OF DESIGNATED COORDINATES

MODIFICATION CANDIDATE SELECTION CONDITIONS

FIG. 6

| MODIFICATION SELECTION CANDIDATE CRITERIA | DESCRIPTION |
|---|---|
| min-area | DESIGNATE MINIMUM AREA VALUE |
| min-width | DESIGNATE MINIMUM WIDTH VALUE |
| min-height | DESIGNATE MINIMUM HEIGHT VALUE |
| max-area | DESIGNATE MAXIMUM AREA VALUE |
| max-width | DESIGNATE MAXIMUM WIDTH IN VALUE |
| max-height | DESIGNATE MAXIMUM HEIGHT IN VALUE |

400 FINALIZED LIST

| NO. | top | left | bottom | right |
|---|---|---|---|---|
| 3 | 10 | 90 | 220 | 130 |
| 4 | 180 | 50 | 220 | 130 |
| | | | | |
| 8 | 10 | 220 | 220 | 250 |

450 MODIFICATION CANDIDATE LIST

| NO. | top | left | bottom | right | WIDTH | HEIGHT | AREA |
|-----|-----|------|--------|-------|-------|--------|------|
| 1 | 10 | 50 | 50 | 250 | 200 | 40 | 8000 |
| 2 | 10 | 50 | 120 | 130 | 80 | 110 | 8800 |
| 6 | 180 | 50 | 220 | 250 | 200 | 40 | 8000 |

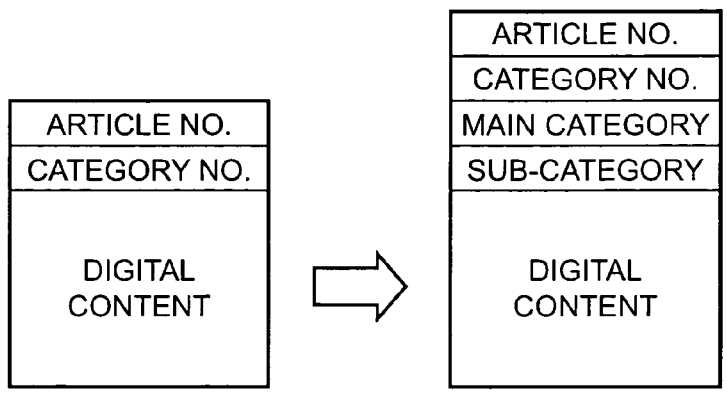

FIG. 13A

340 CATEGORY NUMBER CORRESPONDENCE TABLE

| CATEGORY NO. | MAIN CATEGORY | SUB-CATEGORY |
|---|---|---|
| 1102 | WORLD NEWS | AMERICA |
| 1135 | COMMUNITIES | TOKYO |
| 1122 | POLITICS | ELECTION |
| 1202 | WEATHER | WORLD TEMPERATURES |
| 1310 | BUSINESS | FINANCE |
| 2010 | SPORTS | BASEBALL |
| 2020 | SPORTS | FOOTBALL |
| 2030 | SPORTS | BASKETBALL |
| 2040 | SPORTS | HOCKEY |
| 2050 | SPORTS | SOCCER |
| 2070 | SPORTS | GOLF |
| 3000 | SPORTS | TENNIS |
| 1121 | HOBBY | HISTORY |
| 1500 | HEALTH | PROPHYLAXIS |
| 1401 | ENTERTAINMENT | TELEVISION |
| 1432 | TRAVEL | TOURISM |
| 1501 | SCIENCE AND TECHNOLOGY | COMPUTER |

FIG. 13B

SEGMENT NEAR TOP SIDE

SEGMENT NEAR LEFT SIDE

SEGMENT NEAR BOTTOM SIDE

SEGMENT NEAR RIGHT SIDE

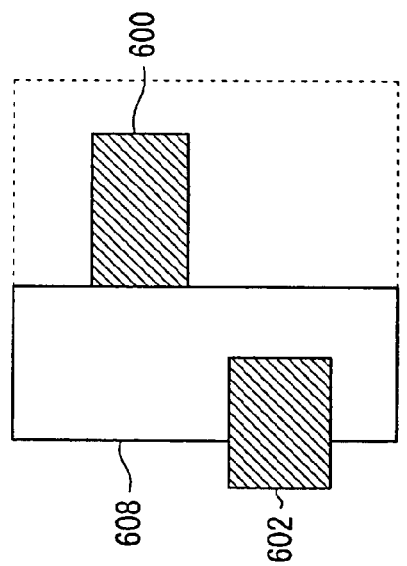
FIG. 22A
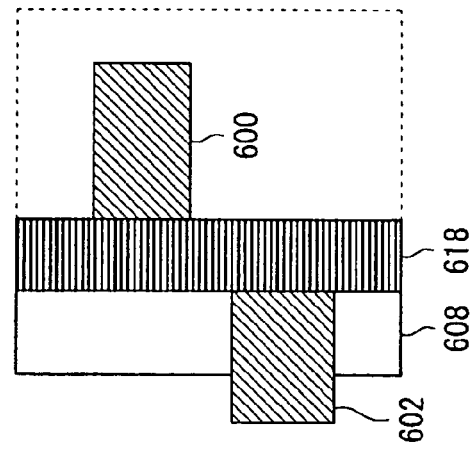
FIG. 22D
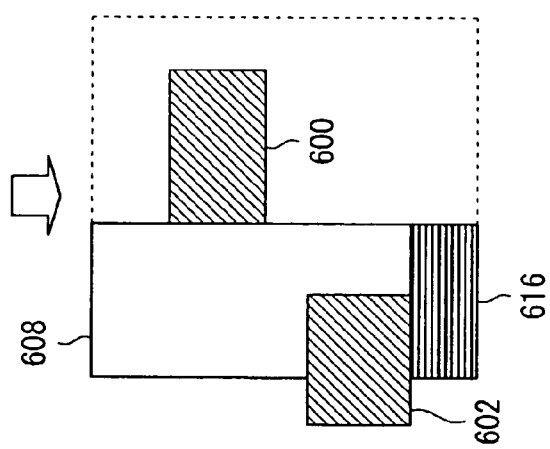
FIG. 22C
FIG. 22B

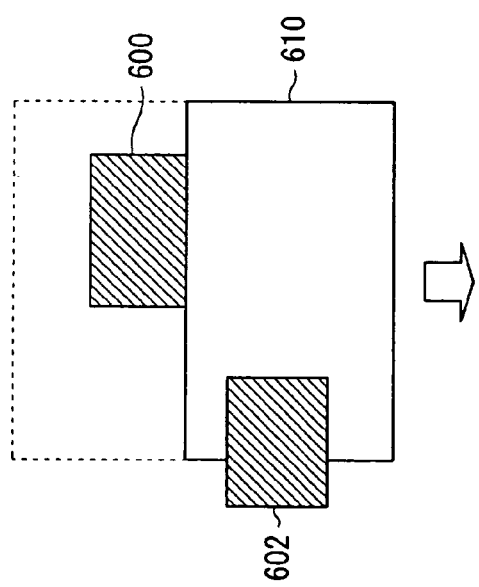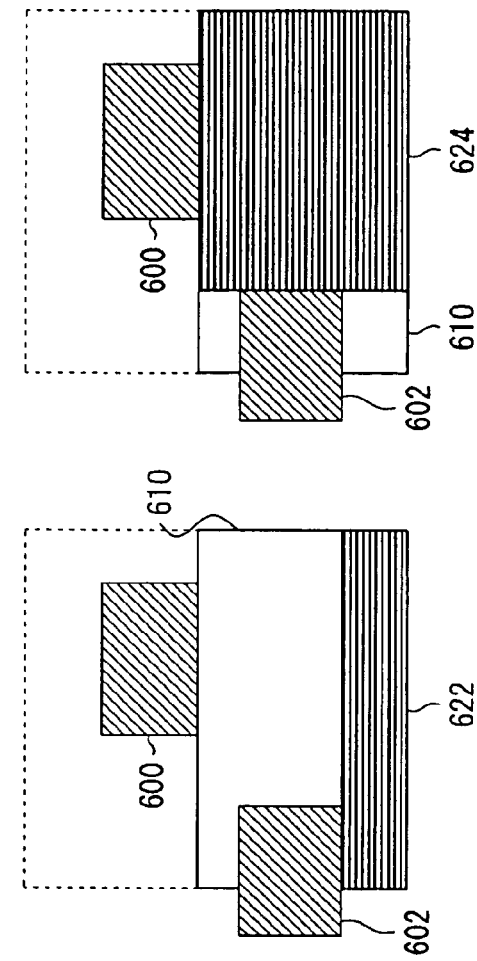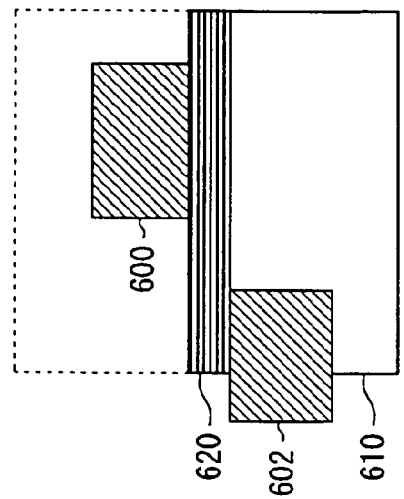
FIG. 23A FIG. 23B FIG. 23C FIG. 23D

450 MODIFICATION CANDIDATE LIST

| NO. | top | left | bottom | right | WIDTH | HEIGHT | AREA |
|---|---|---|---|---|---|---|---|
| 1 | 10 | 50 | 50 | 250 | 200 | 40 | 8000 |
| 2 | 10 | 50 | 120 | 130 | 80 | 110 | 8800 |
| 3 | 10 | 90 | 220 | 130 | 40 | 210 | 8400 |
| 4 | 180 | 50 | 220 | 130 | 80 | 40 | 3200 |
| 5 | 100 | 50 | 120 | 250 | 200 | 20 | 4000 |
| 6 | 180 | 50 | 220 | 250 | 200 | 40 | 8000 |
| 7 | 100 | 90 | 220 | 250 | 160 | 120 | 19200 |
| 8 | 10 | 220 | 220 | 250 | 30 | 210 | 6300 |

FIG. 24

450 MODIFICATION CANDIDATE LIST

| NO. | top | left | bottom | right | WIDTH | HEIGHT | AREA |
|---|---|---|---|---|---|---|---|
| 1 | 10 | 50 | 50 | 250 | 200 | 40 | 8000 |
| 2 | 10 | 50 | 120 | 130 | 80 | 110 | 8800 |
| 3 | 10 | 90 | 220 | 130 | 40 | 210 | 8400 |
| 8 | 10 | 220 | 220 | 250 | 30 | 210 | 6300 |

FIG. 25

450 MODIFICATION CANDIDATE LIST

| NO. | top | left | bottom | right | WIDTH | HEIGHT | AREA |
|---|---|---|---|---|---|---|---|
| 1 | 10 | 50 | 50 | 250 | 200 | 40 | 8000 |
| 2 | 10 | 50 | 120 | 130 | 80 | 110 | 8800 |

FIG. 26

450 MODIFICATION CANDIDATE LIST

| NO. | top | left | bottom | right | WIDTH | HEIGHT | AREA |
|---|---|---|---|---|---|---|---|
| 2 | 10 | 50 | 120 | 130 | 80 | 110 | 8800 |

FIG. 27

450 MODIFICATION CANDIDATE LIST

| NO. | top | left | bottom | right | WIDTH | HEIGHT | AREA |
|---|---|---|---|---|---|---|---|
| 3 | 10 | 90 | 220 | 130 | 40 | 210 | 8400 |
| 8 | 10 | 220 | 220 | 250 | 30 | 210 | 6300 |

FIG. 28

450 MODIFICATION CANDIDATE LIST

| NO. | top | left | bottom | right | WIDTH | HEIGHT | AREA |
|---|---|---|---|---|---|---|---|
| 3 | 10 | 90 | 220 | 130 | 40 | 210 | 8400 |

FIG. 29

450 MODIFICATION CANDIDATE LIST

| NO. | top | left | bottom | right | WIDTH | HEIGHT | AREA |
|---|---|---|---|---|---|---|---|
| 1 | 10 | 50 | 50 | 250 | 200 | 40 | 8000 |
| 2 | 10 | 50 | 120 | 130 | 80 | 110 | 8800 |
| 3 | 10 | 90 | 220 | 130 | 40 | 210 | 8400 |
| 4 | 180 | 50 | 220 | 130 | 80 | 40 | 3200 |
| 6 | 180 | 50 | 220 | 250 | 200 | 40 | 8000 |

FIG. 30

450 MODIFICATION CANDIDATE LIST

| NO. | top | left | bottom | right | WIDTH | HEIGHT | AREA |
|---|---|---|---|---|---|---|---|
| 1 | 10 | 50 | 50 | 250 | 200 | 40 | 8000 |
| 2 | 10 | 50 | 120 | 130 | 80 | 110 | 8800 |
| 4 | 180 | 50 | 220 | 130 | 80 | 40 | 3200 |
| 6 | 180 | 50 | 220 | 250 | 200 | 40 | 8000 |

FIG. 31

450 MODIFICATION CANDIDATE LIST

| NO. | top | left | bottom | right | WIDTH | HEIGHT | AREA |
|---|---|---|---|---|---|---|---|
| 1 | 10 | 50 | 50 | 250 | 200 | 40 | 8000 |
| 6 | 180 | 50 | 220 | 250 | 200 | 40 | 8000 |

FIG. 32

450 MODIFICATION CANDIDATE LIST

| NO. | top | left | bottom | right | WIDTH | HEIGHT | AREA |
|---|---|---|---|---|---|---|---|
| 1 | 10 | 50 | 50 | 250 | 200 | 40 | 8000 |

FIG. 33

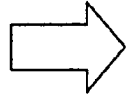
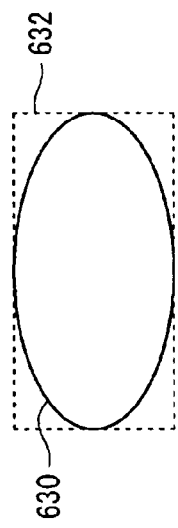
FIG. 34A
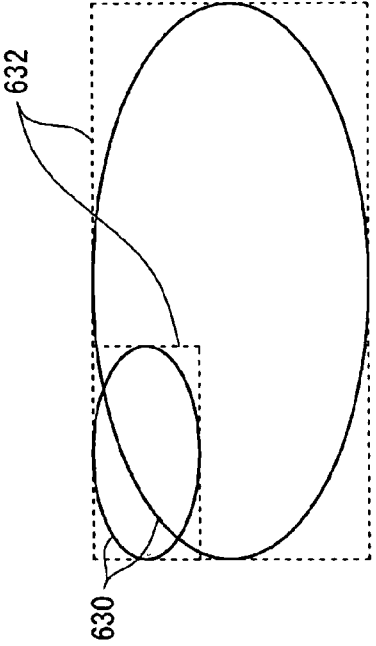
FIG. 34D
EXPANSION OR CONTRACTION IN SIMILAR FASHION
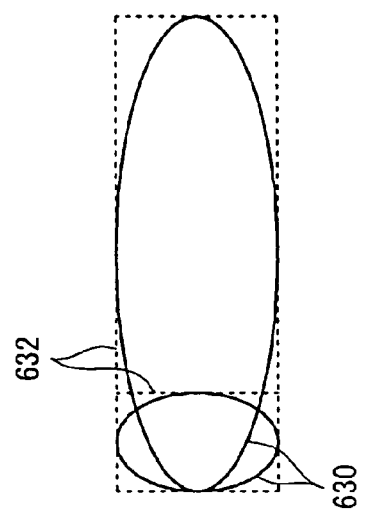
FIG. 34C
EXPANSION OR CONTRACTION IN HORIZONTAL DIRECTION
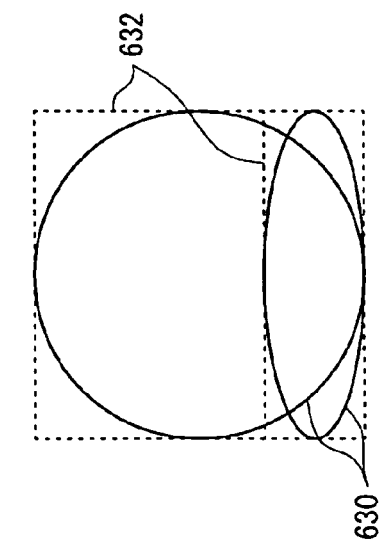
FIG. 34B
EXPANSION OR CONTRACTION IN VERTICAL DIRECTION

LAYOUT SYSTEM, LAYOUT PROGRAM, AND LAYOUT METHOD

BACKGROUND OF THE INVENTION

1. Field of Invention

The present invention relates to a system, a program, and a method to lay out posting information, such as documents and images and, in particular, to a layout system, a layout program, and a layout method appropriate to prevent a layout intended by a designer from being destroyed.

2. Description of Related Art

Digital content delivery systems to provide users digital contents, such as news are available in the related art. Such a related art system reads several digital contents from a content registration database (hereinafter database is simply referred to as DB), edits the read digital contents, and delivers the edited digital contents to a user. In the course of editing, the digital content is arranged in a layout that is easy for the user to see. For example, related art techniques for layout include a document processing apparatus disclosed in Japanese Unexamined Patent Application Publication No. 5-89101 (hereinafter referred to as first related art), a character string automatic editing system disclosed in Japanese Unexamined Patent Application Publication No. 10-154174 (hereinafter referred to as second related art), and a digital content production system disclosed in Japanese Unexamined Patent Application Publication No. 2002-297571 (hereinafter referred to as third related art).

The first related art includes an available area searching unit, a layout structure holding unit, an available area list holding unit, and an available area segmenting unit. The available area searching unit searches for an available area receiving the content of a document, by referencing a layout structure, in the middle of a layout process, held by the layout structure holding unit. The available area list holding unit holds available areas or the list thereof found by the available area searching unit in the search process. If the available area held in the available area list holding unit overlaps with a layout structure that is arranged before the layout process to a logical structure of the document, the available area list holding unit segments the available area taking into consideration the already arranged layout structure, and registers the list of segmented areas in the available area list holding unit.

The first related art dynamically segments the available area rather than statically segmenting beforehand the available area in this way. Regardless of whether a frame is anchored or floated, another content may be placed without paying attention to the frame, and a desired layout results.

The second related art includes a drawing data containing unit, a character string searching unit, a character string peripheral area searching unit and a character string movement unit. An operator views a registered drawing displayed on a display unit, and designates, using a keyboard or an unshown mouse, an area where the overlapping state of character strings must be edited. Drawing data in the area designated by the drawing data containing unit is read. The character string searching unit searches for a character string in the overlapping state thereof. The character string peripheral area searching unit searches for a blank area surrounding the found character string. If a blank area is found, the character string movement unit automatically moves the character string to the blank area, thereby overcoming the overlapping state of the character string. If no blank area is found, a character string contraction unit contracts the character string. Subsequent to the contraction operation, the character string peripheral area searching unit searches for a blank area for the contracted character string. If a blank area is found, the character string movement unit automatically moves the contracted character string into the blank area. If no blank area is found, the character string movement unit moves the character string in response to an instruction from the operator.

In this way, the number of operational steps in the editing process is efficiently reduced, and the efficiency of the operation is enhanced.

The third related art includes a layout definition file that defines the state of arrangement of a layout area in which a first information container frame and a second information container frame partially overlap each other. The layout definition file includes a placement order set for each information container frame. The shape of the first information container frame or the position of the first information container frame within the layout area is determined based on the amount of information of an article to be contained in the first information container frame among a plurality of information container frames. Based on the determined shape or the determined position of the first information container frame, the shape or the position within the layout area of the second information container frame which overlaps with the first information container is determined among the plurality of information container frames. The selected articles are placed into the plurality of information container frames according to the placement order.

The above-mentioned arrangement reduces the possibility that the layout intended by the designer is destroyed by the content of information to be posted, the amount of information, and the logical structure of information. Flexibility in the posting order of information is relatively enhanced.

SUMMARY OF THE INVENTION

If digital contents are perfunctorily laid out in an editing process, the ease of view and aesthetic appearance of a layout can be substantially destroyed. To address the problem, for example, a designer designs several sample layouts in advance, and edits the digital content to achieve a layout intended by the designer based on the sample layouts. In this case, the digital content is preferably edited to a layout substantially identical to the layout intended by the designer regardless of the content of information to be posted, the amount of the information, and the logical structure of the information.

If the available area held in the available area list holding unit overlaps with a layout structure that is arranged before the layout process to the logical structure of the document in the first related art, the available area is segmented taking into consideration the already arranged layout structure. When image information is placed in the available area, a layout intended by the designer may be destroyed as a result of deformation of an image and a development of blank areas if the geometry of the available area is modified through the segmentation of the area. For example, the available area is segmented into two new available areas and one new available area and the other new available area may be merged. If the two areas are different dimensions, such as width or height, an available area obtained as a result of merging becomes different in geometry from the original available area.

If a plurality of character strings overlaps each other in the second related art, a blank area is searched for around the character strings, and the character string is moved into the blank area so that no character strings overlap each other.

But the second related art provides no solution to prevent images from overlapping each other.

In accordance with the third related art, an information container frame is changed in shape and moved in a direction that permits the frame to move therealong when the frame overlaps with another information container frame having a shape already determined. The information container frame may be segmented into a plurality of information container frames depending on the degree of overlap of the information container frames, the content of the information to be posted, the amount of the information, and the logical structure of the information. If the information container frame is modified in geometrical shape before as well as after the segmentation of the frame when image information is placed into the information container frame, the image may be deformed or a blank area may be developed. The layout intended by the designer may be destroyed.

When the information container frame must be maintained in a geometrical shape before as well as after the segmentation process, the same problem may arise not only in the placement of the image information but also to text information container frames or other frames. For example, a case is contemplated that the designer intends to limit the deformation of the information container frame for the layout.

The present invention has been developed with a view to the above drawbacks in the related art. The present invention provides a layout system, a layout program, and a layout method, appropriate to prevent a layout intended by a designer from being destroyed.

To achieve the above, a layout system of a first aspect of the invention includes a layout device to lay out information to be posted, the layout device placing the information in a plurality of information container frames arranged in a predetermined layout area, if the plurality of information container frames overlap each other, the layout device modifies the size of one of the information container frames with the geometrical shape thereof maintained so that none of the container frames overlaps each other.

In this arrangement, the layout device performs a layout process by placing the information into the plurality of information container frames arranged in the predetermined layout area. If the plurality of information container frames overlap each other, the layout device modifies the size of one of the information container frames with the geometrical shape thereof maintained so that none of the container frames overlaps each other.

The size of the information container frame is modified with the geometrical shape maintained regardless of the content of the information to be posted, the amount of the information, and the logical structure of the information. Therefore, in comparison with the related art, the present aspect of the invention reduces the possibility that a layout intended by a designer is destroyed by a deformation of an image or a development of blank areas.

The modification of the frame in size, with the geometrical shape thereof maintained, means that if the information container frame is rectangular prior to the modification thereof, the information container frame still remains rectangular in shape before as well as after the modification thereof. In this case, it is important that the frames before and after modification are rectangular. The frames before and after modification may or may not be similar in shape to each other. A rectangular shape is one example only. The frame may be a polygon, a circle, an ellipse, or another geometrical shape. The same is true of a layout program and a layout method of an aspect of the present invention to be discussed later.

The modification of the frame in size with the geometrical shape thereof maintained means the information container frame maintains the geometrical shape thereof at least subsequent to the modification of the size. It is not a requirement that the geometrical shape be maintained in the middle of the modification process. The same is true of the layout program and the layout method of an aspect of the present invention to be discussed later.

The information to be posted includes text information, image information and other information. The same is true of the layout system, the layout program, and the layout method of an aspect of the present invention to be discussed later.

The term layout refers to a display layout of information to be posted if the information is intended to be displayed on a screen of a display, and refers to a print layout of the information if the information is intended to be printed out on a sheet of paper. The same is true of the layout system, the layout program and the layout method to be discussed later.

The present system may be embodied as a single apparatus, or another apparatus, such as a terminal, or may be embodied as a network system including a plurality of apparatus or a plurality of apparatus, such as terminals. In the latter case, each of elements may belong to any of the plurality of apparatus as long as the elements are linked to each other in communicable manner. The same is true of the layout system to be discussed later.

The "information container frame" in the context of an aspect of the present invention is a frame within which the information to be posted is placed in a predetermined layout area. The information container frame includes a virtual (logical) frame. The frame is not necessarily required in the layout unless the frame is drawn as a frame outline. The frame may or may not be visibly recognized (the same is true throughout this specification).

The "information container frame" is a two-dimensional plane, and the term "overlap" refers to the overlapping of information container frames in plan view (the same is true throughout this specification).

The "modification" refers to a contraction process to contract one of the information container frames in principle so that the one of the information container frames does not overlap with the other of the information container frames (the same is true throughout this specification).

A layout system of a second aspect of the invention includes a layout device to lay out information to be posted, the layout device placing the information in a plurality of information container frames arranged in a layout area. If the layout device determines that the plurality of information container frames overlap each other when the information is placed into the information container frames, the layout device modifies the size of one of the overlapping information container frames with the geometrical shape thereof maintained.

The second aspect, although substantially identical to the first aspect, is stated in different wording to avoid confusion in the understanding of the aspects of the present invention.

As in the first aspect, the size of the information container frame is modified with the geometrical shape thereof maintained regardless of the content of the information to be posted, the amount of the information, and the logical structure of the information. In comparison with the related art, the aspect of the present invention reduces the possibility that a layout intended by a designer is destroyed by a deformation of an image or a development of blank areas.

A layout system of a third aspect of the invention includes an information storage device to store a plurality of pieces of information to be posted, an information selecting device to select information from the plurality of pieces of information in the information storage device and a layout device to lay out the information selected by the information selecting device. The layout device places the information in a plurality of rectangular information container frames arranged in a predetermined layout area thereby performing layout, and if the plurality of rectangular information container frames overlap each other, the layout device modifies the size of one of the rectangular information container frames with the rectangular shape thereof maintained so that none of the rectangular information container frames overlaps each other.

In this arrangement, the information selecting device selects information to be posted from the plurality of pieces of information in the information storage device, and the layout device places the information in the plurality of rectangular information container frames arranged in a layout area. The layout process is thus performed. If the plurality of rectangular information container frames overlap each other, the layout device modifies the size of one of the rectangular information container frames with the rectangular shape thereof maintained so that none of the rectangular information container frames overlaps each other.

Since the size of the information container frame is modified with the rectangular shape thereof maintained regardless of the content of the information to be posted, the amount of information, and the logical structure of the information, the aspect of the present invention reduces the possibility that the layout intended by the designer is destroyed by a deformation of an image or a development of blank areas, in comparison with the related art.

The rectangular information container frame refers to an information container frame having a rectangular shape.

The information storage device stores the information to be posted by any means at any time. The information storage device may store the information beforehand. Rather than storing the information beforehand, the information storage device may store the information at the input thereof from the outside when the present system operates.

Since the workload of a process (calculation) to modify the size of the information container frame is typically smaller in a rectangular shape than in other shapes, the process burden on hardware resources, such as a computer, is reduced.

A layout system of a fourth aspect of the invention includes an information storage device to store a plurality of pieces of information to be posted, an information selecting device to select information from the plurality of pieces of information in the information storage device and a layout device to lay out the information selected by the information selecting device. The layout device places the information in a plurality of rectangular information container frames arranged in a predetermined layout area, and if the layout device determines that the plurality of rectangular information container frames overlap each other when the information is placed into the rectangular information container frames, the layout device modifies the size of one of overlapping rectangular information container frames with the rectangular shape thereof maintained.

The fourth aspect, although substantially identical to the third aspect, is stated in different wording to avoid confusion in the understanding of the aspects of the present invention.

As in the third aspect, the size of the information container frame is modified with the rectangular shape thereof maintained regardless of the content of the information to be posted, the amount of the information, and the logical structure of the information. In comparison with the related art, the fourth aspect reduces the possibility that a layout intended by the designer is destroyed by the deformation of an image or the development of blank areas.

A layout system of a fifth aspect of the invention, according to one of the third and fourth aspects, further includes modification candidate list storage device to store a modification candidate list of a plurality of modification candidates of rectangular information container frames subsequent to the modification. The layout device includes a segmentation frame selecting device to select, as an information container frame to be segmented, one of the plurality of rectangular information container frames overlapping each other, an information container frame segmenting device to segment the one rectangular information container frame selected by the segmentation frame selecting device into a plurality of rectangular information container frames that do not overlap with another one of the plurality of originally overlapping rectangular information container frames, a modification candidate registering device to register the information container frames, segmented by the information container frame segmenting device, in the modification candidate list, a modification candidate selecting device to select a modification candidate from the modification candidate list, and an information container frame modifying device to modify the size of the rectangular information container frame to be segmented, selected by the segmentation frame selecting device, to the rectangular information container frame selected by the modification candidate selecting device.

In this arrangement, when the plurality of rectangular information container overlap each other, the segmentation frame selecting device selects, as an information container frame to be segmented, the one of the plurality of rectangular information container frames overlapping each other, the information container frame segmenting device segments the rectangular information container frame selected by the segmentation frame selecting device into the plurality of rectangular information container frames that do not overlap with the other of the plurality of originally overlapping rectangular information container frames. The modification candidate registering device registers the information container frames, segmented by the information container frame segmenting device, in the modification candidate list. The modification candidate selecting device selects the modification candidate from the modification candidate list, and the information container frame modifying device modifies the size of the rectangular information container frame to be segmented, selected by the segmentation frame selecting device, to the rectangular information container frame selected by the modification candidate selecting device.

Since the size of the information container frame to be segmented is relatively reliably modified with the rectangular shape thereof maintained, the possibility that the layout intended by the designer is destroyed is reduced.

The modification candidate list is not limited to a list structure. Any data structure of the modification candidate list is acceptable as long as the data structure accommodates a plurality of modification candidates. For example, the modification candidate list may have an array structure.

The modification candidate list storage device stores the modification candidate list by any means at any time. The modification candidate list storage device may store the modification candidate list beforehand. Rather than storing the modification candidate list beforehand, the modification candidate list storage device may store the modification candidate list at the input thereof from the outside when the present system operates.

The information container frame segmenting device may actually segment the information container frame to be segmented. Alternatively, the information container frame segmenting device may virtually segment the information container frame.

A layout system of a sixth aspect of the invention, according to one of the third and fourth aspects, further includes modification candidate storage device to store a modification candidate that is a candidate of a rectangular information container frame after the layout device modifies the size of the rectangular information container frame. The layout device includes an information container frame selecting device to select one of the plurality of rectangular information container frames overlapping each other, an information container frame segmenting device to segment the rectangular information container frame selected by the information container frame selecting device into a plurality of rectangular information container frames that do not overlap with another one of the plurality of originally overlapping rectangular information container frames, and a modification candidate registering device to register the rectangular information container frames, segmented by the information container frame segmenting device. In the modification candidate storage device, a modification candidate selecting device to select a modification candidate from the modification candidate storage device, and information container frame modifying device to modify the size of the rectangular information container frame to be segmented, selected by the selecting device, to the rectangular information container frame selected by the modification candidate selecting device.

The sixth aspect, although substantially identical to fifth aspect, is stated in different wording to avoid confusion in the understanding of the aspect of the present invention.

As in the fifth aspect, the size of the information container frame is relatively reliably modified with the rectangular shape thereof maintained and the possibility that the layout intended by the designer is destroyed is further reduced.

In a layout system of a seventh aspect of invention, according to the sixth aspect, the modification candidate storage device is a modification candidate list storage device to store a modification candidate list of a plurality of modification candidates. As in the fifth aspect, the segmented rectangular information container frames are registered in the modification candidate list and the information container frame is modified to the rectangular information container frame selected from the modification candidate list. The information container frames as modification candidates are efficiently handled.

In a layout system of an eighth aspect of the invention, according to one of the fifth through seventh aspects, priority is set to at least three directions among a vertically upward direction, a vertically downward direction, a horizontally leftward direction, and a horizontally rightward direction, in connection with a placement location of the rectangular information container frame and the modification candidate selecting device selects a rectangular information container frame, among the rectangular information container frames registered in the modification candidate list, located at the outermost position in the direction determined based on the priority.

In this arrangement, the modification candidate selecting device selects the rectangular information container frame, among rectangular information container frames registered in the modification candidate list, located at the outermost position in the direction determined based on the priority.

The setting of priority defines the modification manner of the segmentation information container frame. If the designer sets the priority according to the designer's own intention, the possibility that the layout intended by the designer is destroyed is further reduced.

In a layout system of a ninth aspect of the invention, according to one of the fifth through seventh aspects, priority is set to a first direction, a second direction opposite to the first direction, and mutually opposing third and fourth directions in perpendicular to the first and second directions in the predetermined layout area in the placement location of the rectangular information container frame. The modification candidate selecting device selects a rectangular information container frame, among the rectangular information container frames registered in the modification candidate storage device, located at the outermost position in the direction having the highest priority, and then if a plurality of rectangular information container frames is selected, the modification candidate selecting device selects a rectangular information container frame located at the outermost position in the direction having the second highest priority.

The ninth aspect, although substantially identical to the eighth aspect, is stated in different wording to avoid confusion in the understanding of the aspects of the present invention.

Like the eighth aspect, the ninth aspect defines the modification manner of the segmentation information container frames by setting priority to the four directions. If the designer sets the priority according to the designer's own intention, the possibility that the layout intended by the designer is destroyed is further reduced.

In a layout system of a tenth aspect of the invention, according to one of the fifth through seventh aspects, the modification candidate selecting device selects a rectangular information container frame, having the maximum area, among the rectangular information container frames registered in the modification candidate list.

In this arrangement, the modification candidate selecting device selects the rectangular information container frame, having the maximum area, among the rectangular information container frames registered in the modification candidate list.

Since the information container frame having the maximum area is selected, the possibility of causing blanks in the layout area is reduced. As a result, an aesthetically appealing layout is achieved.

In a layout system of an eleventh aspect of the invention, according to the fifth through seventh aspects, the modification candidate selecting device selects a rectangular information container frame from the modification candidate list according to modification candidate selection conditions.

In the above arrangement, the modification candidate selecting device selects one rectangular information container frame from the modification candidate list according to the modification candidate selection conditions.

The modification candidate selection conditions are designated. If the designer designates a condition according to the designer's own intension, the possibility that the layout intended by the designer is destroyed is further reduced.

In a layout system of a twelfth aspect of the invention, according to the eleventh aspect, the modification candidate selection conditions contain a condition to select a rectangular information container frame, having an area equal to or larger than a predetermined area, among the rectangular information container frames registered in the modification candidate list.

If the above condition is designated as the modification candidate selection condition in the above arrangement, the modification candidate selecting device selects the rectangular information container frame, having the area equal to or larger than the predetermined area, among the rectangular information container frames registered in the modification candidate list.

If the designer's intention is a layout that is constructed by selecting the modification candidate having the area equal to or larger than the predetermined area, the designer can construct the layout relatively faithfully reflecting the designer's own intention. The possibility that the layout intended by the designer is destroyed is further reduced. Since the modification candidate having the area equal to or larger than the predetermined area is selected, the possibility that blanks develop in the layout area is reduced. A relatively aesthetically appealing layout is thus provided.

In a layout system of a thirteenth aspect of the invention, according to one of the eleventh and twelfth aspects, the modification candidate selection conditions contain a condition to select a rectangular information container frame, having an area equal to or smaller than a predetermined area, among the rectangular information container frames registered in the modification candidate list.

If the condition is designated among the modification candidate selection conditions in the above arrangement, the modification candidate selecting device selects the rectangular information container frame having the area equal to or smaller than the predetermined area, among the rectangular information container frames registered in the modification candidate list.

If the designer's intention is a layout that is constructed by selecting the modification candidate having the area equal to or smaller than the predetermined area, the designer can construct the layout relatively faithfully reflecting the designer's own intention. The possibility that the layout intended by the designer is destroyed is further reduced.

In a layout system of a fourteenth aspect of the invention according to one of the eleventh through thirteenth aspects, the modification candidate selection conditions contain a condition to select a rectangular information container frame, having a horizontal length equal to or longer than a predetermined length, among the rectangular information container frames registered in the modification candidate list.

If the above condition is designated from the modification candidate selection conditions, the modification candidate selecting device selects the rectangular information container frame having the horizontal length equal to or longer than the predetermined length, among the rectangular information container frames registered in the modification candidate list.

If the designer's intention is a layout that is constructed by selecting the modification candidate having the horizontal length equal to or longer than the predetermined length, the designer can construct the layout relatively faithfully reflecting the designer's own intention. The possibility that the layout intended by the designer is destroyed is further reduced.

In a layout system of a fifteenth aspect of the invention, according to one of the eleventh through thirteenth aspects, the modification candidate selection conditions contain a condition to select a rectangular information container frame, having a length equal to or longer than a predetermined length in horizontal directions (specifically, a first direction and a second direction, among the first direction, the second direction opposite to the first direction, and mutually opposing third and fourth directions in perpendicular to the first and second directions in the predetermined layout area), among the rectangular information container frames registered in the modification candidate list.

The fifteenth aspect, although substantially identical to the fourteenth aspect, is stated in different wording to avoid confusion in the understanding of the aspects of the present invention.

When the above condition is designated as the modification candidate selection condition, the modification candidate selecting device selects the rectangular information container frame, having the length equal to or longer than the predetermined length in the horizontal directions (specifically, the first direction and the second direction, among the first direction, the second direction opposite to the first direction, and the mutually opposing third and fourth directions in perpendicular to the first and second directions in the predetermined layout area), among the rectangular information container frames registered in the modification candidate list.

If the designer's intention is a layout that is constructed by selecting the modification candidate having the length equal to or longer than the predetermined length in the first direction and the second direction, the designer can construct the layout relatively faithfully reflecting the designer's own intention. The possibility that the layout intended by the designer is destroyed is further reduced.

In a layout system of a sixteenth aspect of the invention, according to one of the eleventh through fifteenth aspects, the modification candidate selection conditions contain a condition to select a rectangular information container frame, having a horizontal length equal to or shorter than a predetermined length, among the rectangular information container frames registered in the modification candidate list.

If the above condition is designated as the modification candidate selection condition in this arrangement, the modification candidate selecting device selects the rectangular information container frame, having the horizontal length equal to or shorter than the predetermined length, among the rectangular information container frames registered in the modification candidate list.

If the designer's intention is a layout that is constructed by selecting the modification candidate having the horizontal length equal to or shorter than the predetermined length, the designer can construct the layout relatively faithfully reflecting the designer's own intention. The possibility that the layout intended by the designer is destroyed is further reduced.

In a layout system of a seventeenth aspect of the invention, according to one of the eleventh through sixteenth aspects, the modification candidate selection conditions contain a condition to select a rectangular information container frame, having a length equal to or shorter than a predetermined length in horizontal directions (specifically, a first direction and a second direction, among the first direction, the second direction opposite to the first direction, and mutually opposing third and fourth directions in perpendicular to the first and second directions in the predetermined layout area) among the rectangular information container frames registered in the modification candidate list.

The seventeenth aspect, although substantially identical to the sixteenth aspect, is stated in different wording to avoid confusion in the understanding of the aspects of the present invention.

If the above condition is designated as the modification candidate selection condition, the modification candidate selecting device selects the rectangular information container frame, having the length equal to or shorter than the predetermined length in the horizontal directions (specifically, the first direction and the second direction, among the first direction, the second direction opposite to the first direction, and the mutually opposing third and fourth directions in perpendicular to the first and second directions in the predetermined layout area), among the rectangular information container frames registered in the modification candidate list.

If the designer's intention is a layout that is constructed by selecting the modification candidate having the length equal to or shorter than the predetermined length in the first direction and the second direction, the designer can construct the layout relatively faithfully reflecting the designer's own intention. The possibility that the layout intended by the designer is destroyed is further reduced.

In a layout system of an eighteenth aspect of the invention, according to one of the eleventh through seventeenth aspects, the modification candidate selection conditions contain a condition to select a rectangular information container frame, having a vertical length equal to or longer than a predetermined length, among the rectangular information container frames registered in the modification candidate list.

If the above condition is designated as the modification candidate selection condition in this arrangement, the modification candidate selecting device selects the rectangular information container frame, having the vertical length equal to or longer than the predetermined length, among the rectangular information container frames registered in the modification candidate list.

If the designer's intention is a layout that is constructed by selecting the modification candidate having the vertical length equal to or longer than the predetermined length, the designer can construct the layout relatively faithfully reflecting the designer's own intention. The possibility that the layout intended by the designer is destroyed is further reduced.

In a layout system of a nineteenth aspect of the invention, according to one of the eleventh through seventeenth aspects, the modification candidate selection conditions contain a condition to select a rectangular information container frame, having a length equal to or longer than a predetermined length in vertical directions (specifically, a third direction and a fourth direction, among a first direction, a second direction opposite to the first direction, and mutually opposing third and fourth directions in perpendicular to the first and second directions in the predetermined layout area), among the rectangular information container frames registered in the modification candidate list.

The nineteenth aspect, although substantially identical to the eighteenth aspect, is stated in different wording to avoid confusion in the understanding of the aspects of the present invention.

If the above condition is designated as the modification candidate selection condition, the modification candidate selecting device selects the rectangular information container frame, having the length equal to or longer than the predetermined length in the vertical directions (specifically, the third direction and the fourth direction, among the first direction, the second direction opposite to the first direction, and the mutually opposing third and fourth directions in perpendicular to the first and second directions in the predetermined layout area), among the rectangular information container frames registered in the modification candidate list.

If the designer's intention is a layout that is constructed by selecting the modification candidate having the length equal to or longer than the predetermined length in the third direction and the fourth direction, the designer can construct the layout relatively faithfully reflecting the designer's own intention. The possibility that the layout intended by the designer is destroyed is further reduced.

In a layout system of a twentieth aspect of the invention, according to one of the eleventh through nineteenth aspects, the modification candidate selection conditions contain a condition to select a rectangular information container frame having a vertical length equal to or shorter than a predetermined length, among the rectangular information container frames registered in the modification candidate list.

If the above condition is designated as the modification candidate selection condition in this arrangement, the modification candidate selecting device selects the rectangular information container frame, having the vertical length equal to or shorter than the predetermined length, among the rectangular information container frames registered in the modification candidate list.

If the designer's intention is a layout that is constructed by selecting the modification candidate having the vertical length equal to or longer than the predetermined length, the designer can construct the layout relatively faithfully reflecting the designer's own intention. The possibility that the layout intended by the designer is destroyed is further reduced.

In a layout system of a twenty-first aspect of the invention, according to one of the eleventh through nineteenth aspects, the modification candidate selection conditions contain a condition to select a rectangular information container frame, having a length equal to or shorter than a predetermined length in vertical directions (specifically, a third direction and a fourth direction, among a first direction, a second direction opposite to the first direction, and mutually opposing third and fourth directions in perpendicular to the first and second directions in the predetermined layout area), among the rectangular information container frames registered in the modification candidate list.

The twenty-first aspect, although substantially identical to the twentieth aspect, is stated in different wording to avoid confusion in the understanding of the aspects of the present invention.

If the above condition is designated as the modification candidate selection condition in the above arrangement, the modification candidate selecting device selects the rectangular information container frame, having the length equal to or shorter than the predetermined length in the vertical directions (specifically, the third direction and the fourth direction, among the first direction, the second direction opposite to the first direction, and the mutually opposing third and fourth directions in perpendicular to the first and second directions in the predetermined layout area), among the rectangular information container frames registered in the modification candidate list.

If the designer's intention is a layout that is constructed by selecting the modification candidate having the length equal to or shorter than the predetermined length in the third direction and the fourth direction, the designer can construct the layout relatively faithfully reflecting the designer's own intention. The possibility that the layout intended by the designer is destroyed is further reduced.

A layout system of a twenty-second aspect of the invention, according to one of the second through twenty-first aspects, further includes a user information storage device to store user information relating to a user, the information selecting device selects the information to be posted among the plurality of pieces of information based on the user information in the user information storage device.

In this arrangement, the information selecting device selects the information to be posted among the plurality of pieces of information based on the user information in the user information storage device.

Since information unique to a user concerning the selection of the information to be mounted and information designated by the user are referenced, the layout system produces the layout having the content faithfully reflecting the desire of the user.

The user information here contains the age, the sex, the personal preferences, the address the name of the user and an operational environment relating to a user terminal. The same is true of the following layout systems.

The user information storage device stores the user information by any means at any time. The user information storage device may store the information beforehand. Rather than storing the user information beforehand, the user information storage device may store the user information at the input thereof from the outside when the present system operates. The same is true of the layout systems to be discussed below.

A layout system of a twenty-third aspect of the invention, according to one of the second through twenty-second aspects, further includes user information storage device to store user information relating to a user, the layout device lays out the information to be posted, selected by the information selecting device, based on the user information in the user information storage device.

The layout device lays out information selected by the information selecting device based on the user information in the user information storage device.

Since the information unique to a user concerning the layout and the information designated by the user are referenced, the layout system produces the layout having the content faithfully reflecting the desire of the user.

The layout process may be performed based on the user information that contains the age information of the user. The use of a relatively large font size is contemplated if the user is a relatively aged person. The user information may contain sex information. The layout of using a rounded font is contemplated if the user is female, for example. The user information may contain interest and preference information. The use of, for example, a layout more like magazines intended for children, more like sport journals, or more like technical documents is contemplated depending on the interest and preference of the user. If the user information contains address information, a layout having the scene of an area corresponding to the address as a background is contemplated. If the user information contains the name of the user, a layout having the name thereof as a title is contemplated. If the user information contains information of the operational environment relating to the user terminal, a layout that avoids the use of an image of a large amount of data may be adopted when the capacity of an RAM of the user terminal is small.

To achieve the above, a layout program of a twenty-fourth aspect of the invention causes a computer to perform a process of the layout device in the layout system of the first aspect, if the plurality of information container frames overlap each other, the layout device modifies the size of one of the information container frames with the geometrical shape thereof maintained so that none of the information container frames overlaps each other.

In this arrangement, the computer reads the program, and performs the process in accordance with the read program. The layout program of the twenty-fourth aspect thus provides the same effect and advantages as those of the layout system of the first aspect.

To achieve the above, a layout program of a twenty-fifth aspect of the invention causes a computer to perform a process of the layout device in the layout system of the first aspect, if the layout device determines that the plurality of information container frames overlap each other, the layout device modifies the size of one of overlapping information container frames with the geometrical shape thereof maintained so that none of the information container frames overlaps each other.

The twenty-fifth aspect, although substantially identical to the twenty-fourth aspect, is stated in different wording to avoid confusion in the understanding of the aspects of the present invention.

In this arrangement, the computer reads the program, and performs the process in accordance with the read program. The layout program of the twenty-fourth aspect thus provides the same effect and advantages as those of the layout system of the first aspect.

To achieve the above, a layout method of a twenty-sixth aspect of the invention includes a layout step to lay out information to be posted, the layout step including placing the information in a plurality of information container frames arranged in a predetermined layout area, if the plurality of information container frames overlap each other, the size of one of the information container frames is modified in the layout step with the geometrical shape thereof maintained so that none of the rectangular information container frames overlaps each other.

The layout method of the twenty-sixth aspect thus provides the same effect and advantages as those of the layout system of the first aspect.

To achieve the above, a layout method of a twenty-seventh aspect of the invention includes a layout step to lay out information to be posted, the layout step including placing the information in a plurality of information container frames arranged in a predetermined layout area, wherein if it is determined in the layout step that the plurality of information container frames overlap each other, the size of one of overlapping information container frames is modified in the layout step with the geometrical shape thereof maintained so that none of the information container frames overlaps each other.

The twenty-seventh aspect, although substantially identical to the twenty-sixth aspect, is stated in different wording to avoid confusion in the understanding of the aspects of the present invention. The layout method of the twenty-seventh aspect thus provides the same effect and advantages as those of the layout system of the first aspect.

BRIEF DESCRIPTION OF THE DRAWINGS

FIG. 4 is a schematic illustrating the data structure of a user profile table 300;

FIG. 5 illustrates a layout state defined by a page template;

FIG. 6 illustrates the data structure of the page template;

FIG. 11 illustrates the data structure of a finalized list 400;

FIG. 12 illustrates the data structure of a modification candidate list 450;

FIGS. 13A and 13B illustrate digital contents and the data structure of a category number correspondence table 340;

FIGS. 22A-22D illustrate layout states in a segmentation process of an information container frame 608;

FIGS. 23A-23D illustrate layout states in a segmentation process of an information container frame 610;

FIG. 24 illustrates the data structure of the modification candidate list 450;

FIG. 25 illustrates the data structure of the modification candidate list 450;

FIG. 26 illustrates the data structure of the modification candidate list 450;

FIG. 27 illustrates the data structure of the modification candidate list 450;

FIG. 28 illustrates the data structure of the modification candidate list 450;

FIG. 29 illustrates the data structure of the modification candidate list 450;

FIG. 30 illustrates the data structure of the modification candidate list 450;

FIG. 31 illustrates the data structure of the modification candidate list 450;

FIG. 32 illustrates the data structure of the modification candidate list 450;

FIG. 33 illustrates the data structure of the modification candidate list 450; and FIGS. 34A-34D illustrate a shape changing process in which an elliptical information container frame is expanded or contracted together with a rectangular information container frame.

DETAILED DESCRIPTION OF EXEMPLARY EMBODIMENTS

The exemplary embodiments of the present invention will now be discussed with reference to the drawings. FIGS. 1 through 33 illustrate a layout system, a layout program, and a layout method in accordance with the exemplary embodiments of the present invention.

Figure 1:
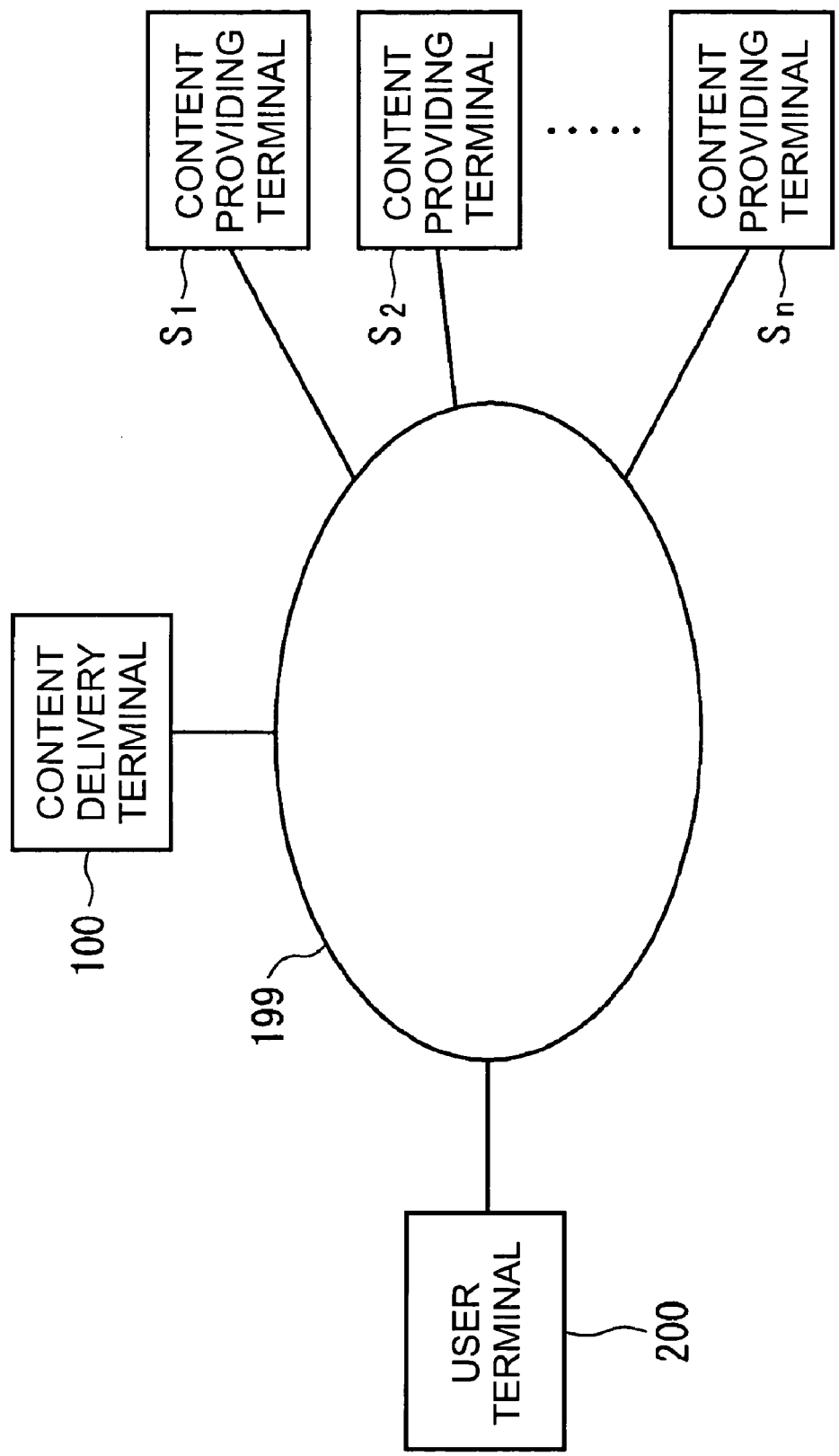
FIG. 1 is a block schematic illustrating the structure of a network system implementing an aspect of the present invention.

The layout system, the layout program, and the layout method in accordance with the exemplary embodiments of the present invention are applied to a system in which a content delivery terminal 100 delivers digital contents, such as news to a user terminal 200, as shown in FIG. 1.

The structure of the network system implementing the present invention is discussed with reference to FIG. 1.

FIG. 1 is a block schematic illustrating the structure of the network system implementing an aspect of the present invention.

As shown in FIG. 1, connected to the Internet 199 are a plurality of content providing terminals S1-Sn to provide digital contents, a content delivery terminal 100 that collects, stores, and delivers the digital contents provided by the content providing terminals S1-Sn (hereinafter the digital contents supplied by the content providing terminals S1-Sn are also referred to as article information or simply articles), and a user terminal 200 used by a user. For easy understanding of an aspect of the present invention, a single user terminal 200 is shown. In practice, a plurality of user terminals are connected to the Internet 199.

Each of the content providing terminals S1-Sn has the same function as a typical computer having a CPU, an ROM, an RAM, interfaces, etc., connected to each other through a bus. When digital content is produced, a category number identifying the category of the digital content is attached to the digital content. The digital content with the category number attached thereto is sent to the content delivery terminal 100. The category number will be discussed more in detail later.

The user terminal 200 has the same function as a typical computer having a CPU, an ROM, an RAM, interfaces, etc., connected to each other through a bus. The user terminal 200 has a WWW (World Wide Web) browser. Using the WWW browser, the user terminal 200 accesses the content delivery terminal 100.

The major functions of the content delivery terminal 100 will be described in detail with reference to FIG. 2.

Figure 2:
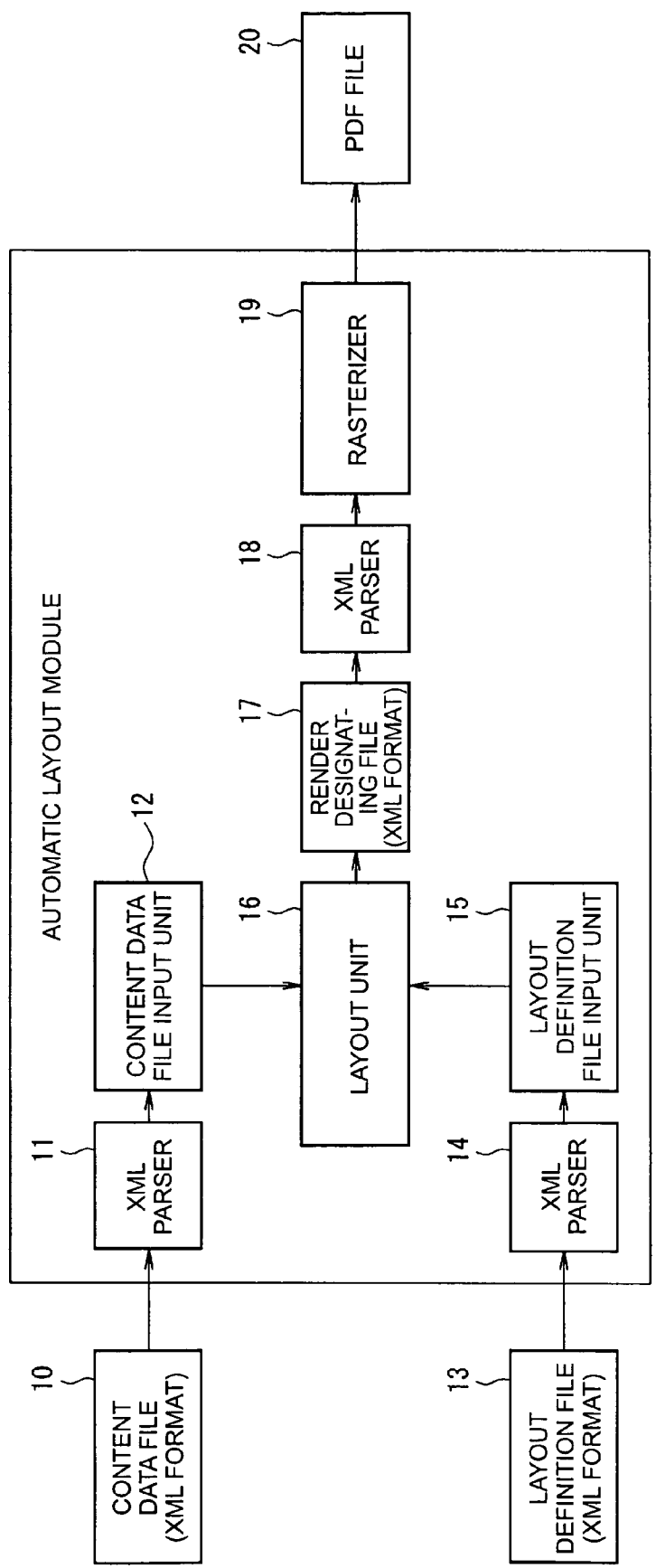
FIG. 2 is a functional block schematic illustrating major functions of a content delivery terminal 100.

FIG. 2 is a functional block schematic illustrating the major functions of the content delivery terminal 100.

Referring to FIG. 2, the content delivery terminal 100 includes an XML parser 11 to parse a content data file 10 in an XML (eXtensive Markup Language), a content data file input unit 12 to input the content data file 10 parsed by the XML parser 11, an XML parser 14 to analyze an layout definition file 13 (referring to a page template and a template application rule to be discussed later) in an XML, a layout definition file input unit 15 to input the layout definition file 13 parsed by the XML parser 14, a layout unit 16 to perform a layout process based on the content data file 10 and the layout definition file 13 respectively received through the input units 12 and 15, an XML parser 18 to parse an XML render designating file 17 from the layout unit 16 and a rasterizer 19 to produce a file 20 in a PDF (Portable Document Format) by performing rendering based on the XML render designating file 17 parsed by the XML parser 18.

Particularly, the feature of this exemplary embodiment of the present invention lies in the layout unit 16 among other elements.

Figure 3:
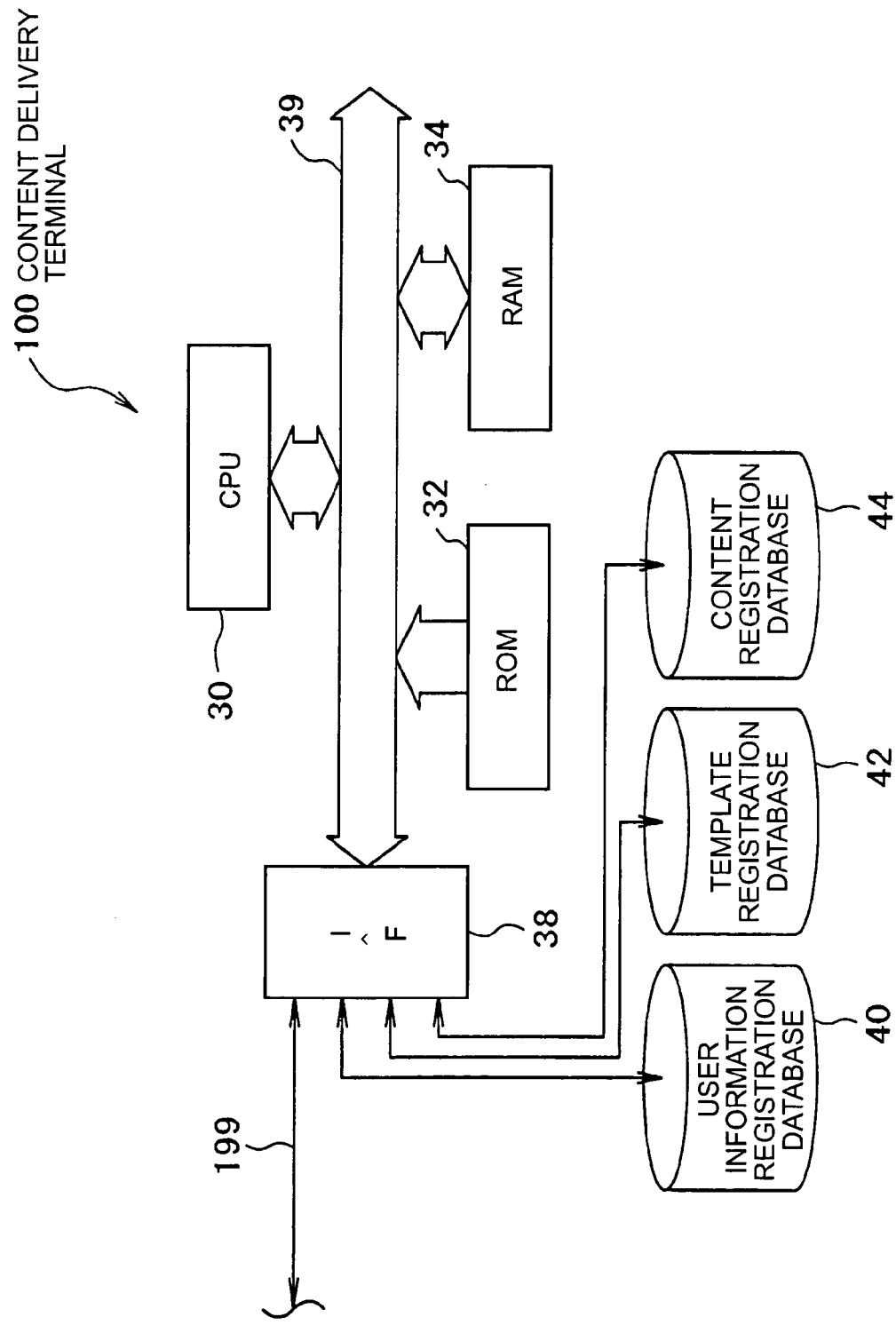
FIG. 3 is a block schematic illustrating the structure of the content delivery terminal 100.

Referring to FIG. 3, the content delivery terminal 100 will now be discussed in detail.

FIG. 3 is a block schematic of the content delivery terminal 100.

As shown, the content delivery terminal 100 includes a CPU 30 to perform arithmetic operation and controlling the entire system based on a control program, an ROM 32 to store beforehand the control program, etc., of the CPU 30 in a predetermined area thereof, an RAM 34 to store data read from the ROM 32 or the like and calculation results required in the course of the arithmetic operation of the CPU 30 and an interface 38 to interface with an external device for exchange of data. To exchange data, these elements are mutually interconnected by a bus 39, as a signal line to transfer data.

Connected to the interface 38 are, as external units, a user information registration DB 40 to register user information, a template registration DB 42 to register a page template defining the frame structure of a layout in a layout area on a per page basis, a content registration DB 44 to collect and store digital contents supplied by the content providing terminals S1-Sn and a signal line connected to the Internet 199.

The data structure of the user information registration DB 40 is discussed in detail below with reference to the drawings.

As shown in FIG. 4, the user information registration DB 40 stores a user profile table 300 having user information registered therewithin.

FIG. 4 illustrates the data structure of the user profile table 300.

The user profile table 300 registers a single or a plurality of records for each user, as shown in FIG. 4. Each record includes a field 302 to register a user ID to identify a user, a field 304 to register a destination address of a digital content, a field 306 to register a category number, a field 308 to register a keyword, a field 310 to register the date of delivery, a field 312 to register the time of delivery, a field 314 to register a layout number, a field 316 to register the maximum number of pages and a field 318 to register a font size.

When a digital content containing a keyword designated by a user is selected as data to be delivered, the field 308 registers that keyword. The keyword may be the one that appears most frequently in the document of a category in which the user is interested. Referring to FIG. 4, a "PROCESSOR" is registered in a first row of the field 308, and an "OS (Operating System)" is registered in a second row of the field 308.

The field 310 registers the date of delivery on which the user desires the delivery of the digital content. For example, when the delivery of the digital content is desired everyday, "EVERYDAY" is designated. When the delivery of the digital content is desired on a weekday only, a "WEEKDAY" is designated. When the delivery of the digital content is desired on a weekend only, a "WEEKEND" is designated. Referring to FIG. 4, "EVERYDAY" is registered in a first row of the field 310, and a "WEEKDAY" is registered in a second row of the field 310.

The field 312 registers the time of delivery of the digital content on the delivery date designated by the user. As the time of delivery, one day may be divided into 24 hours from a zero hour slot to a twenty-third hour slot, and any time slot is designated. Referring to FIG. 4, a fifth hour slot is registered in a first row of the field 312 and an eleventh hour slot is registered in a second row in the field 312.

The field 314 registers the layout number to identify the output layout of the digital content. For example, the layout number identifies the output layout desired by the user. Referring to FIG. 4, layout number 2 is registered in a first row of the field 314, and layout number 5 is registered in a second row of the field 314. The layout number will be discussed in detail later.

The field 316 registers the maximum number of pages at the upper limit when the digital content is displayed or printed out. The maximum number of pages designates the maximum number of pages at the upper limit. Alternatively, the letter "u" may be designated to set no upper limit. Referring to FIG. 4, "2" pages are registered in a first row of the field 316 and the letter "u" is registered in a third row of the field 316.

The field 318 registers the font size when the digital content is displayed or printed out. Referring to FIG. 4, a "SMALL" font is registered in a first row of the field 318, and a "STANDARD" font is registered in a third row of the field 318.

Referring to the drawings, the data structure of the template registration DB 42 is discussed.

The template registration DB 42 stores a plurality of different page templates.

The structure of the page template is discussed with reference to FIGS. 5 and 6.

FIG. 5 illustrates a layout state defined by a page template.

FIG. 6 illustrates the data structure of the page template.

As shown in FIG. 5, the page template defines the layout state in which a title information container frame 362 to contain title information therewithin, a text information container frame 364 to contain text information therewithin, image information container frame 366 and image information containing frame 368, to contain image information and a text information container frame 370 are arranged in a layout area 360. FIG. 5 illustrates one example only, and the shapes, the sizes, and the number of the information container frames and the locations of the information container frames within the layout area 360 are different from page template to page template.

As shown in FIG. 6, the page template sets a layout format by interposing a tag set of a start tag and an end tag between a predetermined start tag (for example, ) and a predetermined end tag (for example, ). Described in the example of FIG. 6 are a tag set of 500 and 502 to set the image information container frame, a tag set of 504 and 506 to set the placement location of the image information container frame and a tag set of 508 and 510 to set the modification method to modify the size of the image information container frame.

Described within the tag set of 504 and 506 are a tag set of 512 and 514 to set a Y coordinate of the top side of the image information container frame, a tag set 516 and 518 to set an X coordinate of the left side of the image information container frame, a tag set of 520 and 522 to set a Y coordinate of the bottom side of the image information container frame and a tag set of 524 and 526 to set an X coordinate of the right side of the image information container frame.

The tag set of 512 and 514 describes "10". The tag set of 516 and 518 describes "50". The tag set of 520 and 522 describes "220". The tag set of 524 and 526 describes "250". These tag sets define the image information container frame enclosed by coordinates (50, 10), (250, 10), (50, 220), and (250, 220) in the layout area 360. In the discussion that follows, the placement location of the information container frame is expressed by the Y coordinate of the top side thereof, the X coordinate of the left side thereof, the Y coordinate of the bottom side thereof and the X coordinate of the right side thereof with commas inserted therebetween to delimit these coordinates.

Described between the tag set of 508 and 510 are a tag set of 528 and 530 to set modification candidate selection conditions when the image information container frame is segmented into a plurality of modification candidate frames and one of the plurality of segmented modification candidates frames is selected. Also described between the tag set of 508 and 510 is a tag set of 532 and 534 to set the modification candidate selection method when the image information container frame is segmented into the plurality of modification candidate frames and the one of the plurality of segmented modification candidate frames is selected.

In accordance with the present exemplary embodiment, when one image information container frame overlaps with another information container frame, the one image information container frame is segmented into a plurality of modification candidate frames that do not overlap with the other information containing fame and the segmented modification candidate frames are registered in a modification candidate list. One of the modification candidate frames is selected from the modification candidate list according to modification candidate selection conditions and modification candidate selection method. The size of the image information container frame is modified to the size of the modification candidate container frame. In this way, the image information container frame is modified in size with the rectangular shape thereof maintained, thereby becoming a frame not overlapping the other frame.

Figures 7, 8:
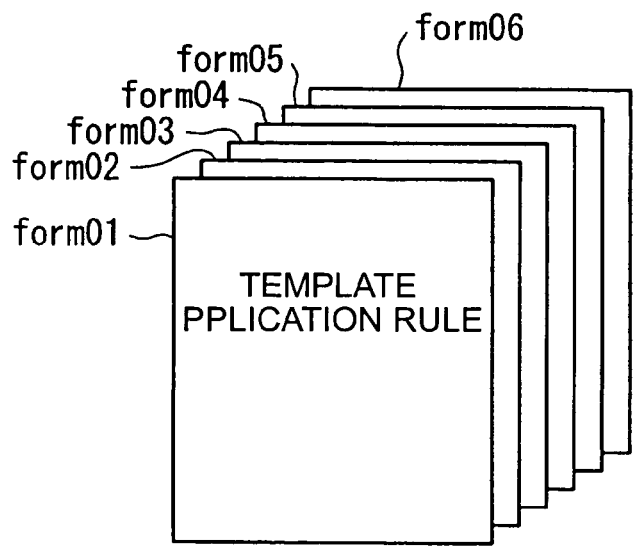
FIG. 7 is a table listing types of modification candidate selection conditions.
FIG. 8 illustrates the data structure of a template application rule.

FIG. 7 is a table listing types of modification candidate selection conditions.

The conditions that can be set as the modification candidate selection conditions in FIG. 7 are a minimum area selection condition (min-area) to select a modification candidate frame having an area equal to or larger than a predetermined area from the modification candidate list, a minimum width selection condition (min-width) to select a modification candidate frame having a width (a horizontal length) equal to or wider than a predetermined width from the modification candidate list, and a minimum height selection condition (min-height) to select a modification candidate frame having a height (a vertical length) equal to or larger than a predetermined height from the modification candidate list. Furthermore, the conditions that can be set are a maximum area selection condition (max-area) to select a modification candidate frame having an area equal to or smaller than a predetermined area from the modification candidate list, a maximum width selection condition (max-width) to select a modification candidate frame having a width equal to or narrower than a predetermined width from the modification candidate list, and a maximum height selection condition (max-height) to select a modification candidate frame having a height equal to or smaller than a predetermined height from the modification candidate list.

In the example of FIG. 6, the minimum width selection condition, the minimum height selection condition, and the maximum area selection condition are described as being "40", "40", and "10000" by the tag set of 528 and 530. This description requires that a modification candidate frame having a width of 40 or more, a height of 40 or more, an area of 10000 or less be selected from the modification candidate list.

Returning to FIG. 6, described between the tag set of 532 and 534 is a tag set of 536 and 538 to set a priority to at least three directions among vertically upward and downward directions and horizontally rightward and leftward directions in the placement location of the image information container frame. The tag set of 536 and 538 describes "left, right, and top". First, this means that a modification candidate frame having a placement location at the outermost position in the horizontally leftward direction (the minimum value in the X coordinate) is selected. Second, if a plurality of frames is obtained, a modification candidate frame having a placement location at the outermost position in the horizontally rightward direction (the maximum value in the X coordinate) is selected from the results of the first selection. Third, if a plurality of frames is obtained as the results of the second selection, a modification candidate frame having a placement location at the outermost position in the vertically upward direction (the minimum value in the Y coordinate) is selected from the results of the second selection. Fourth, if a plurality of frames is obtained as the results of the third selection, a modification candidate frame having a placement location at the outermost position in the vertically downward direction (the maximum value in the Y coordinate) is selected from the results of the third selection.

The template registration DB 42 stores a plurality of different template application rules form 01-form 06, as shown in FIG. 8. The structure of the template application rule will be discussed in detail with reference to FIGS. 8 and 9.

Figure 9:
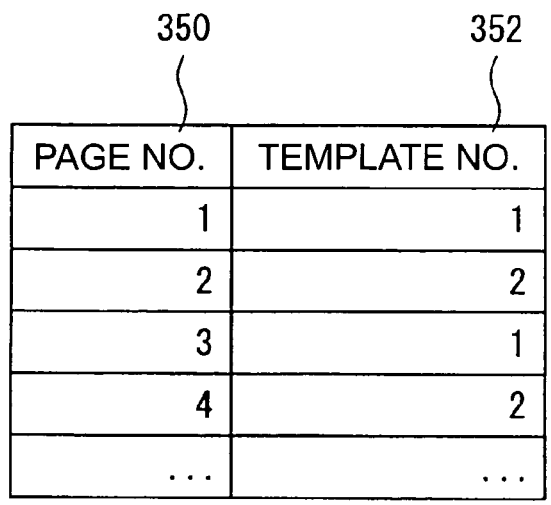
FIG. 9 illustrates the data structure of a template application rule.

FIGS. 8 and 9 illustrate the data structure of the template application rule.

The template application rule defines the manner of applying the template to each layout area 360 assuming that a layout result requires a plurality of layout areas 360. As shown in FIG. 9, a single record is registered for each page. Each record includes a field 350 to register a page number therein, and a field 352 to register a template number to identify a page template.

Referring to FIG. 9, "1" as a page number and "1" as a template number are registered in a first row record. This defines that the page template having the template number of "1" be applied to the layout area 360 of a top page.

Figure 10:
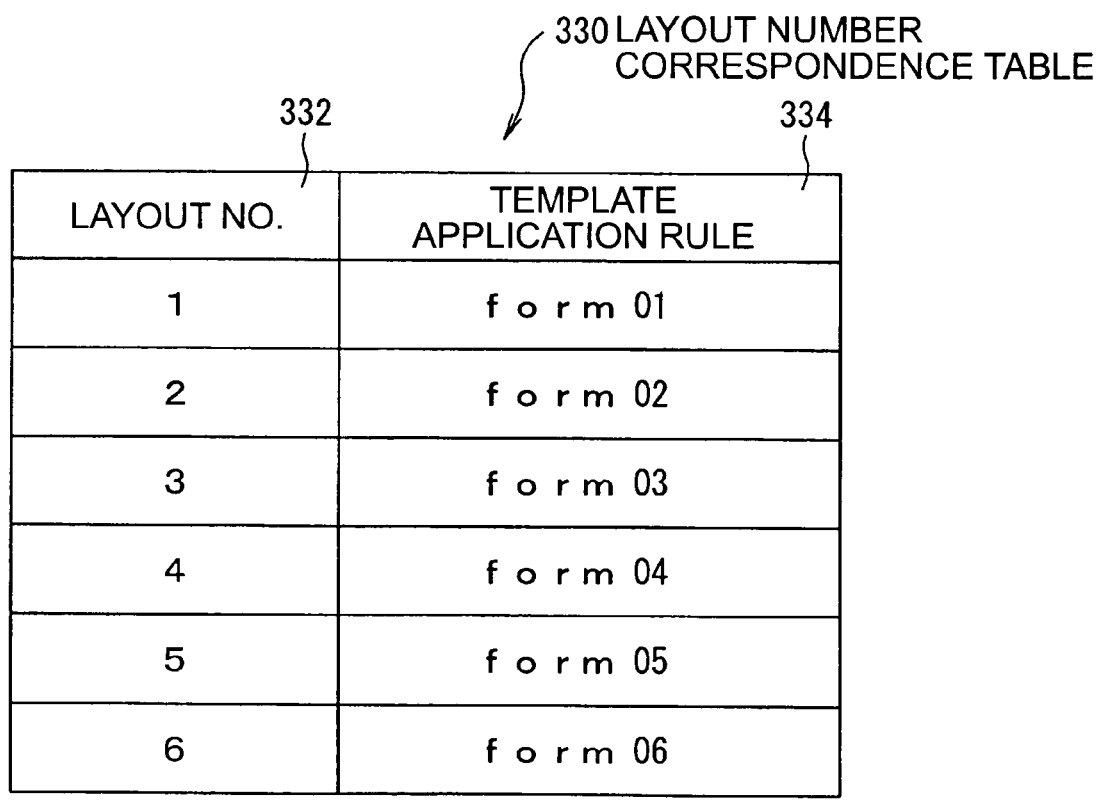
FIG. 10 illustrates the data structure of a layout number correspondence table 330.

As shown in FIG. 10, the template registration DB 42 stores a layout number correspondence table 330 listing the correspondence between the template application rules form 01-form 06 and the layout numbers. The structure of the layout number correspondence table 330 will be discussed with reference to FIG. 10.

FIG. 10 shows the data structure of the layout number correspondence table 330.

As shown in FIG. 10, one record is registered for a respective layout number. Each record includes a field 332 to register the layout number and a field 334 to register the template application rule.

In the example of FIG. 10, "1" as a layout number and "form 01" as a template application rule name are registered in a first row record, and "2" as a layout number and "form 02" as a template application rule name are registered in a second row record.

The template registration DB 42 stores a finalized list 400 to register a finalized container frame that contains an article and is finalized in the placement location thereof and a modification candidate list 450 to register a modification candidate frame therewithin. Referring to FIGS. 11 and 12, the structures of the finalized list 400 and the modification candidate list 450 will now be described.

FIG. 11 illustrates the data structure of the finalized list 400.

FIG. 12 illustrates the data structure of the modification candidate list 450.

As illustrated in FIG. 11, a single record is registered on a per finalized frame basis in the finalized list 400. Each record contains a field 402 to register the ID of a finalized container frame therein, a field 404 to register a Y coordinate of the top side of the finalized container frame therein, a field 406 to register an X coordinate of the left side of the finalized container frame therein, a field 408 to register a Y coordinate of the bottom side of the finalized container frame therein, and a field 410 to register an X coordinate of the right side of the finalized container frame.

A single record is registered on a per modification candidate container frame basis in the modification candidate list 450, as shown in FIG. 12. Each record contains a field 452 to register the ID of a modification candidate container frame therein, a field 454 to register a Y coordinate of the top side of the modification candidate container frame therein, a field 456 to register an X coordinate of the left side of the modification candidate container frame therein, a field 458 to register a Y coordinate of the bottom side of the modification candidate container frame therein, a field 460 to register a X coordinate of the left side of the modification candidate container frame therein, a field 462 to register the width of the modification candidate container frame therein, a field 464 to register the height of the modification candidate container frame therein, and a field 466 to register the area of the modification candidate container frame therein.

The data structure of the content registration DB 44 will now be discussed in detail with reference to the drawings.

As shown in FIG. 13, the content registration DB 44 stores the digital contents supplied by the content providing terminals S1-Sn, and the category number correspondence table 340 listing the correspondence between a main category, a sub-category, and a category number.

FIG. 13 illustrates the data structure of the digital content and the category number correspondence table 340.

Each of the digital contents supplied by the content providing terminals S1-Sn has an article number and a category number attached thereto as illustrated in FIG. 13A. The content delivery terminal 100 classifies the digital contents according to category number and then registers the classified digital contents onto the content registration DB 44. The content delivery terminal 100 references the category number correspondence table 340, thereby registering the digital contents with the main category and the sub-category attached thereto, in addition to the article number and the category number, during registration. The digital content contains, as a single article, information representing a title of an article, image information relating to an image of the article, and text information relating to the text of the article.

Referring to FIG. 13B, a single record is registered on a per main category basis and on a per sub-category basis in the category number correspondence table 340. Each record contains a field 342 to register a category number therein, a field 344 to register a main category therein and a field 346 to register a sub-category therein.

In the example of FIG. 13B, a first row record registers "1102" as the category number, "WORLD NEWS" as the main category, and "AMERICA" as the sub-category therein, and a sixth row record registers "2010" as the category number, "SPORTS" as the main category, and "BASEBALL" as the sub-category therein.

The structure of the CPU 30 and the process performed by the CPU 30 are described with reference to FIGS. 14 and 15.

Figure 14:
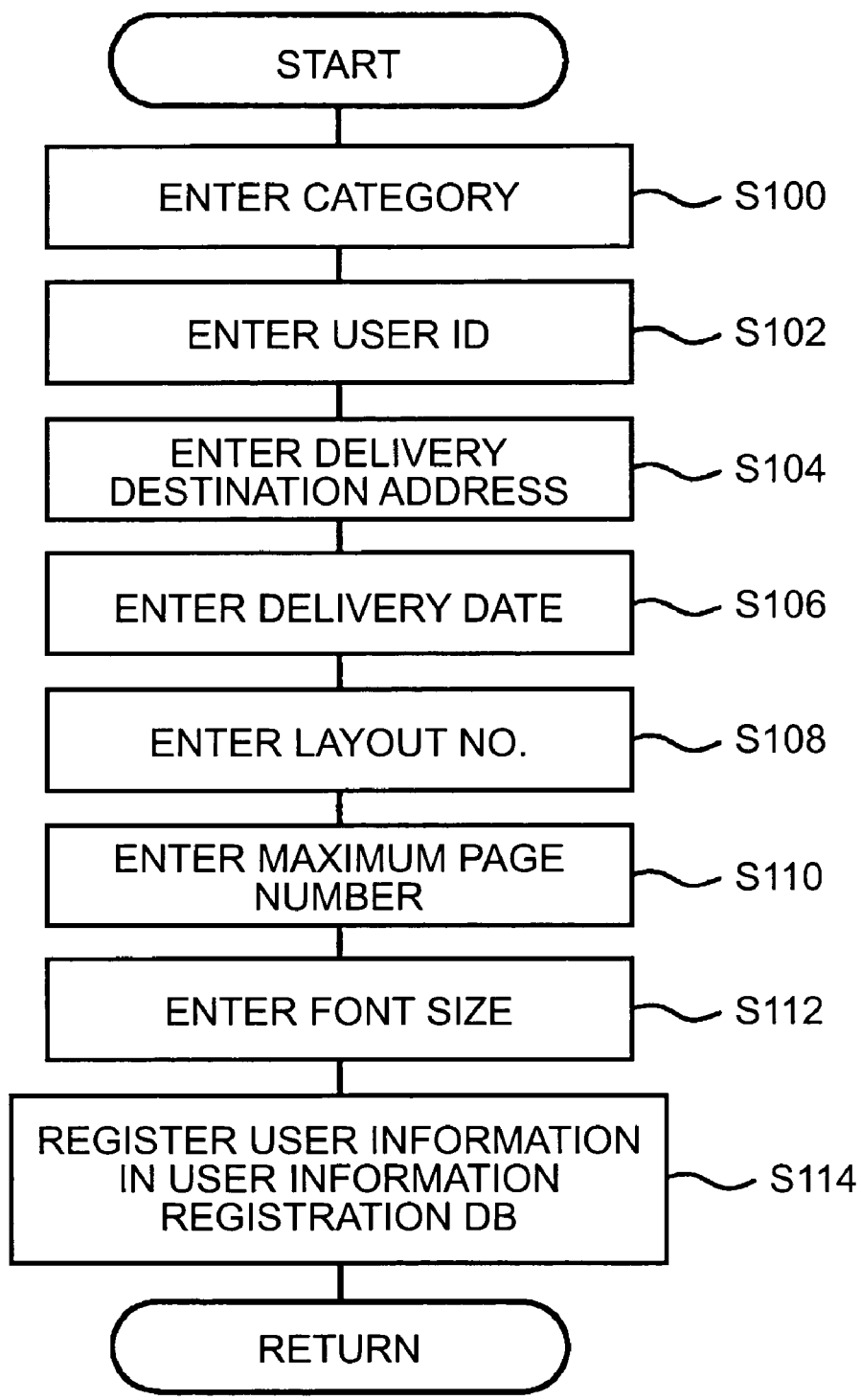
FIG. 14 is a flowchart of a user registration process.
Figure 15:
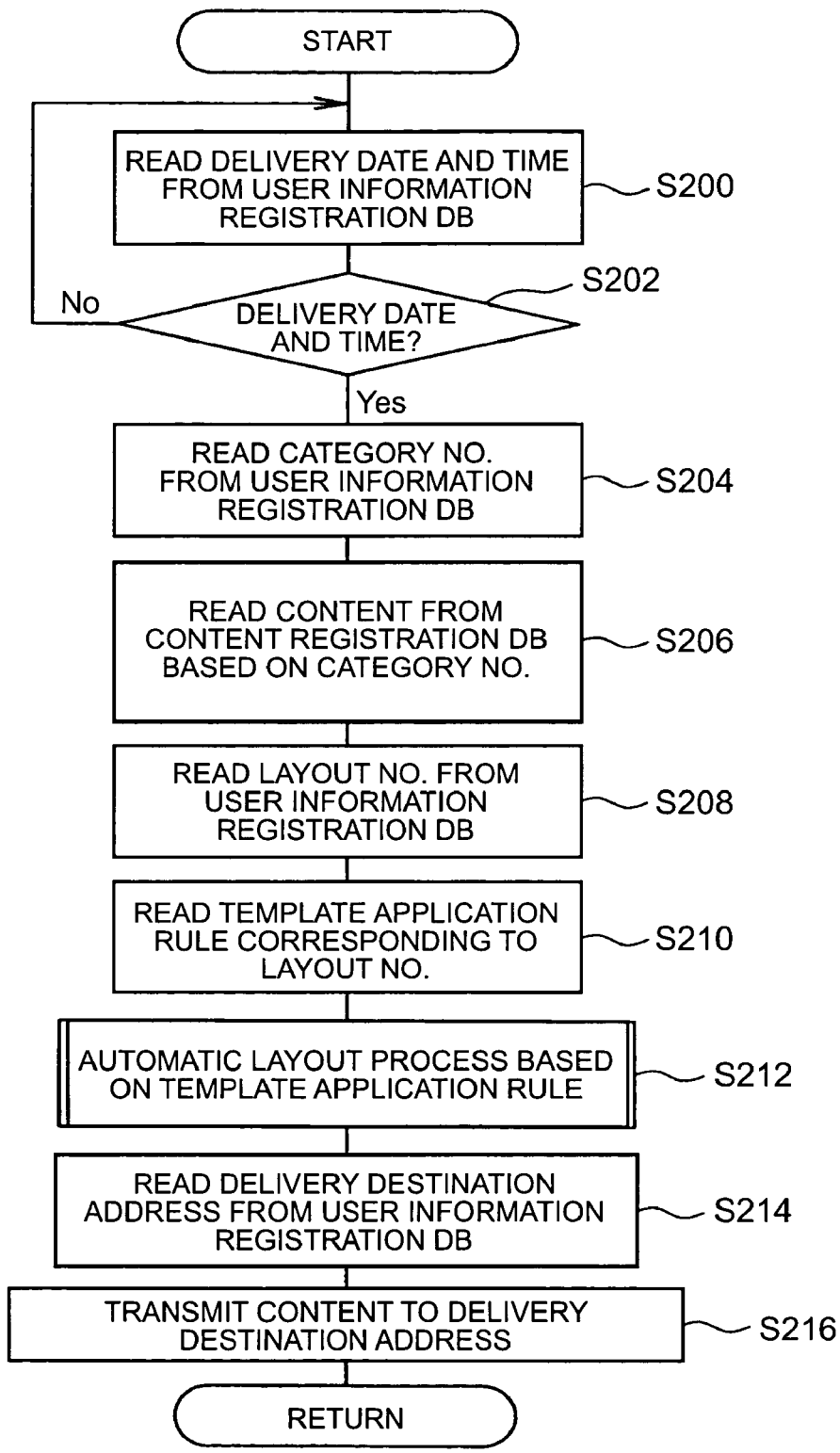
FIG. 15 is a flowchart of a content delivery process.

The CPU 30, composed of a microprocessor unit MPU, etc., starts a predetermined program stored in a predetermined area of the ROM 32 and executes a user registration process and a content delivery process in a time division manner in flowcharts shown in FIGS. 14 and 15.

The user registration process is described first in detail with reference to FIG. 14.

FIG. 14 is the flowchart describing the user registration process.

When a user has accessed the system, the CPU 30 requests the user to input the required user information, such as the user ID, and registers the input user information in the user profile table 300 in the user registration process. When the CPU 30 starts, the process starts with step S100 shown in FIG. 14. An input operation in each of the following steps is performed interactively with the user.

In step S100, the main category and the sub-category are input. In step S102, the user ID and the password are entered. In step S104, the destination address is input, and in step S106, the date and time of delivery are input, and the routine proceeds to step S108.

In step S108, the layout number is input. In step S110, the maximum number of pages is input. In step S112, the font size is input. The routine proceeds to step S114, where the CPU 30 registers user information input in steps S100-S112 in the user profile table 300. The CPU 30 ends the series of steps, and then returns to the original process.

Referring to FIG. 15, the content delivery process will be discussed in detail.

FIG. 15 is a flowchart showing the content delivery process.

In the content delivery process, the user profile table 300 is referenced to deliver the digital content to the user terminal 200. The content delivery process is executed by the CPU 30. Referring to FIG. 15, the CPU 30 starts with step S200. The process of the following steps is performed for each record of the user profile table 300. In practice, each step is performed by the number of times equal to the number of records registered in the user profile table 300.

In step S200, the date and time of delivery are read from the user profile table 300. In step S202, the CPU 30 determines, from the read date and time of delivery, whether it is the day on which the digital content must be delivered. When the CPU 30 determines that it is the day on which the digital content must be delivered (i.e., yes), the routine proceeds to step S204, or else (i.e., no) the routine proceeds to step S200.

In step S204, the CPU 30 reads the category number from the user profile table 300. In step S206, the CPU 30 searches for the digital content in the content registration DB 44 according to the read category number and retrieves the digital content having a category number matching the read category number. The routine proceeds to step S208.

In step S208, the CPU 30 reads the layout number from the user profile table 300. In step S210, the CPU 30 references the layout number correspondence table 330 and reads the template application rule corresponding to the read layout number from the template registration DB 42. In step S212, the CPU 30 performs an automatic layout process in which the output layout of the digital content retrieved in step S206 is determined based on the read template application rule and thereby the available digital content is produced. The routine then proceeds to step S214.

In step S214, the CPU 30 reads the destination address from the user profile table 300. In step S216, the CPU 30 delivers the produced available digital content to the read destination address. The CPU 30 ends the above series of process steps and returns to the original process.

The automatic layout process in step S212 is discussed in detail with reference to FIG. 16.

Figure 16:
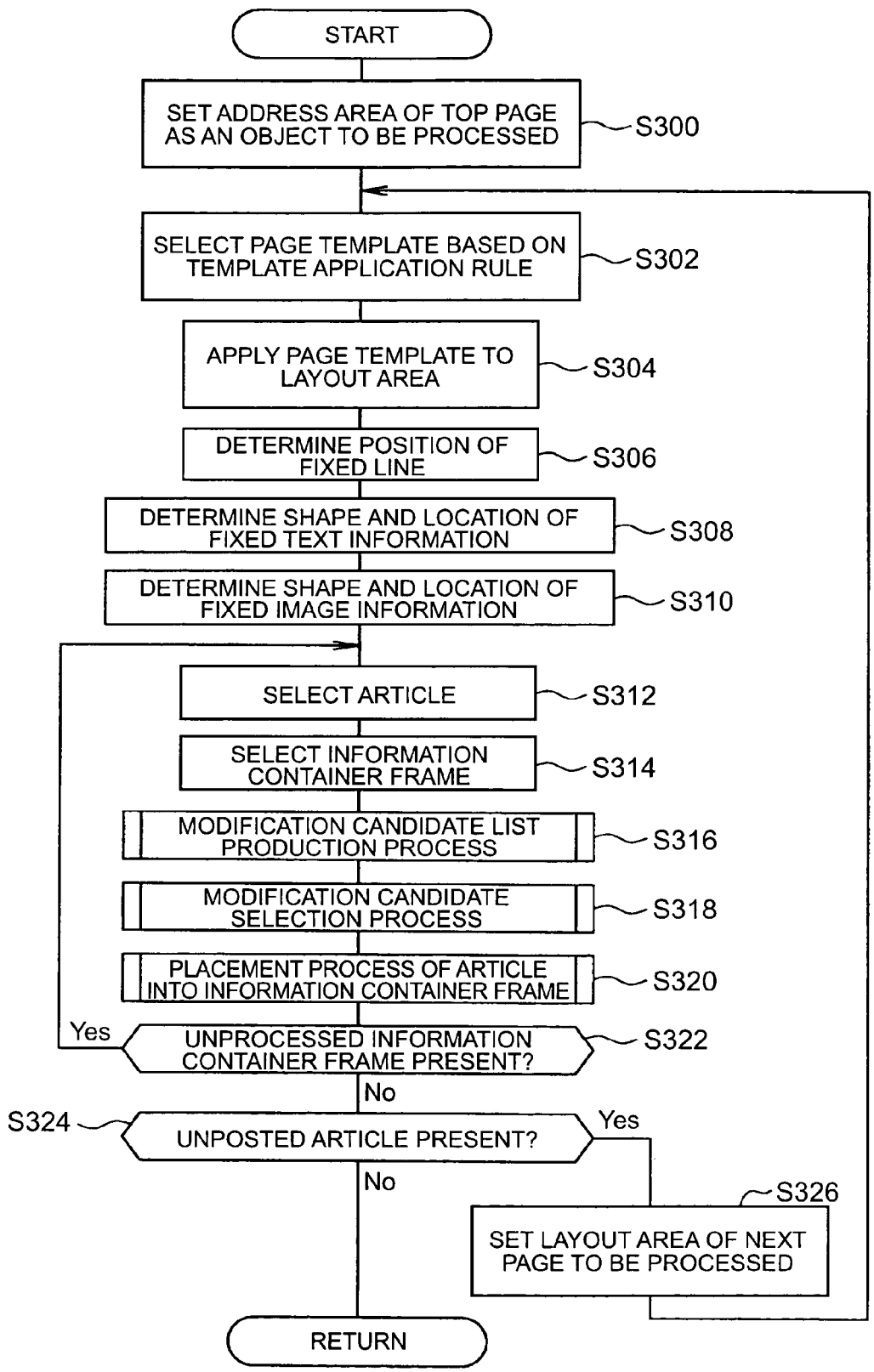
FIG. 16 is a flowchart of an automatic layout process.

FIG. 16 is a flowchart illustrating the automatic layout process.

When the automatic layout process is initiated in step S212, the process starts with step S300, as shown in FIG. 16.

In step S300, the CPU 30 sets the layout area 360 on the top page as an object to be processed. In step S302, the CPU 30 reads the page template from the template registration DB 42 based on the template application rule read in step S210. In step S304, the CPU 30 applies the read page template to the current layout area 360. The routine proceeds to step S306.

In step S306, the CPU 30 determines the location of a fixed line anchored to the page. In step S308, the CPU 30 determines the shape and location of the fixed text information anchored to the page. In step S310, the CPU 30 determines the shape and location of the fixed image information anchored to the page. The routine then proceeds to step S312.

In step S312, the CPU 30 selects an article to be placed in the layout area 360, among the digital contents found in the search in step S206, according to the predetermined priority order. In step S314, the CPU 30 selects an information container frame from the layout area 360 which is currently to be processed (hereinafter a current layout area 360) according the predetermined priority order. The routine then proceeds to step S316.

In step S316, the modification candidate list 450 is produced. In step S318, a modification candidate container frame is selected from the modification candidate list 450. In step S320, the article selected in step S312 (hereinafter the selected article) is placed into the information container frame selected in S314 (hereinafter the selected information container frame). The routine then proceeds to step S322.

In step S322, the CPU 30 determines whether an unprocessed information container frame is still present in the current layout area 360. If it is determined that no unprocessed container frame is present (i.e., no), the routine proceeds to step S324. The CPU 30 determines whether an unposted article is present among the digital contents searched and retrieved in step S206. If it is determined that no unposted article is present (i.e., no), a series of process steps is completed, and the CPU 30 returns to an original process.

If it is determined that an unposted article is present (i.e., yes), the routine proceeds to step S326. The CPU 30 sets a next page layout area 360 as an object to be processed. The routine proceeds to step S302.

If it is determined in step S322 that an unprocessed information container frame is present in the current layout area 360 (i.e., yes), the routine proceeds to step S312.

The modification candidate list production process in step S316 will now be discussed in detail with reference to FIG. 17.

Figure 17:
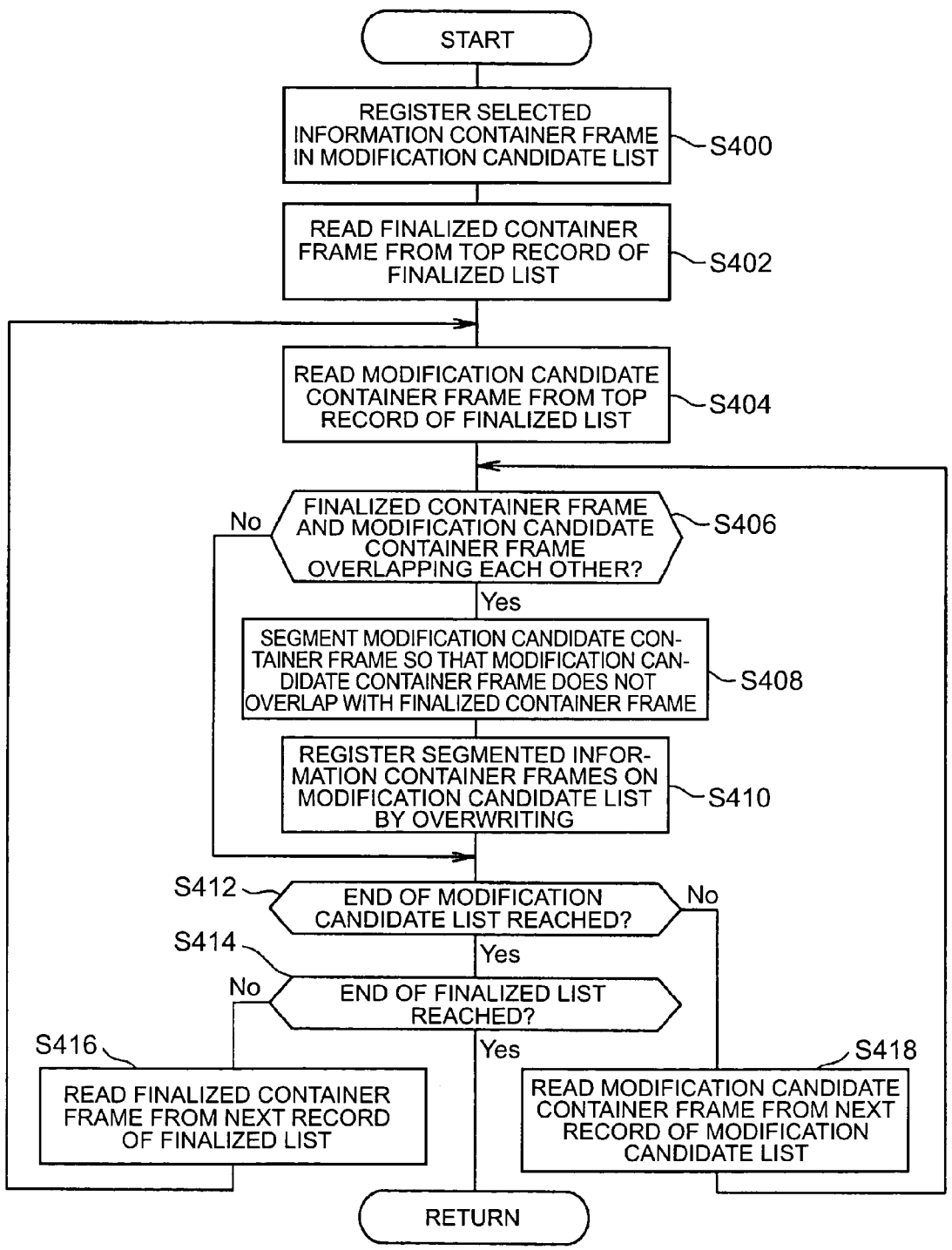
FIG. 17 is a flowchart of a modification candidate list production process.

FIG. 17 is a flowchart showing the modification candidate list production process.

In the modification candidate list production process, one selected information container frame is segmented into modification candidate container frames that do not overlap with another finalized container frame if the one selected information container frame overlaps with the other finalized container frame. The segmented modification candidate frames are registered in the modification candidate list 450. If the modification candidate list production process is initiated in step S316, the process starts with step S400.

In step S400, the modification candidate list 450 is initialized and the selected information container frame is registered in the modification candidate list 450. In step S402, the finalized container frame is read from the top record of the finalized list 400. In step S404, the modification candidate container frame is read from the top record of the modification candidate list 450. The routine then proceeds to step S406.

In step S406, it is determined whether the finalized container frame overlaps with the modification candidate container frame. If it is determined that the finalized container frame overlaps with the modification candidate container frame (i.e., yes), the routine proceeds to step S408. The modification candidate container frame is segmented into a plurality of information container frames so that no information container frames overlap with the finalized container frame. The routine proceeds to step S410.

In step S410, each of the segmented information container frames is registered in the modification candidate list 450 through overwriting. Specifically, each segmented information container frame is registered on the modification candidate list 450 instead of the modification candidate container frames read from the modification candidate list 450 immediately before registration.

In step S412, the CPU 30 determines whether the process reaches the end of the modification candidate list 450. If it is determined that the end of the modification candidate list 450 is reached (i.e., yes), the routine proceeds to step S414. The CPU 30 determines whether the process has reached the end of the finalized list 400. If it is determined that the end of the finalized list 400 is reached (i.e., yes), the series of process steps is completed. The CPU 30 returns to the original process.

If it is determined in step S414 that the end of the finalized list 400 has not yet been reached (i.e., no), the routine proceeds to step S416. A finalized container frame is read from a next record in the finalized list 400. The routine proceeds to step S404.

If it is determined in step S412 that the end of the modification candidate list 450 has not yet been reached (i.e., no), the routine proceeds to step S418. A modification candidate container frame is read from a next record in the modification candidate list 450. The routine then proceeds to step S406.

If it is determined in step S406 that no modification candidate container frame overlaps with the finalized container frame (i.e., no), the routine proceeds to step S412.

The modification candidate selection process in step S318 will now be discussed in detail with reference to FIG. 18.

Figure 18:
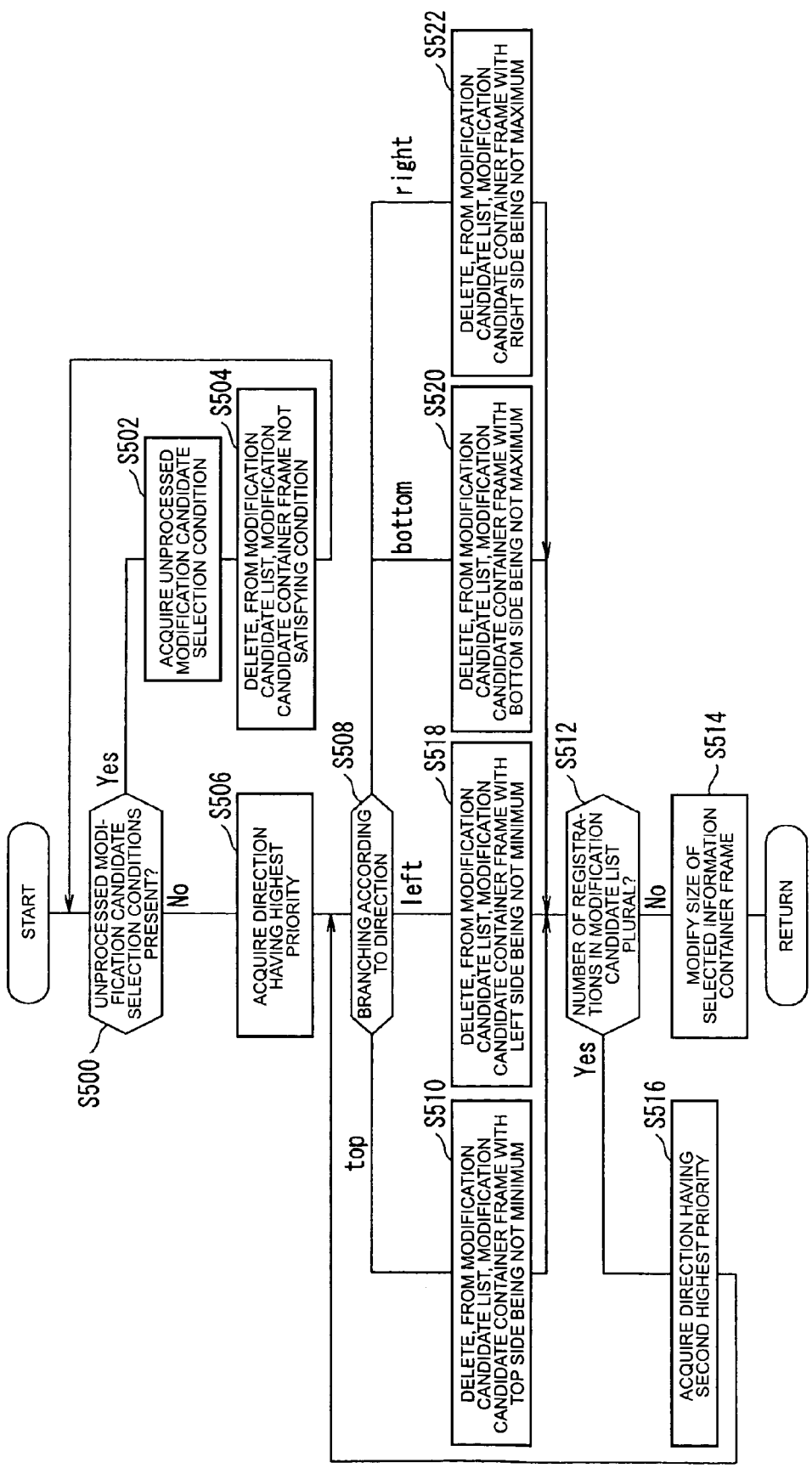
FIG. 18 is a flowchart of a modification candidate selection process.

FIG. 18 is a flowchart illustrating the modification candidate selection process.

In the modification candidate selection process, a modification candidate container frame is selected from the modification candidate list 450 according to the modification candidate selection conditions and the modification candidate selection method. The selected information container frame is modified in size to the selected modification candidate container frame. When the modification candidate selection process is initiated in step S381, the CPU 30 starts with step S500 as shown in FIG. 18.

In step S500, the CPU 30 determines whether an unprocessed modification candidate selection condition is present in the selected information container frame. If it is determined that an unprocessed modification candidate selection condition is present (i.e., yes) in the selected information container frame, the routine proceeds to step S502. The unprocessed modification candidate selection condition is acquired from the selected information container frame. In step S504, the modification candidate container frame not satisfying the acquired modification candidate selection condition is deleted from the modification candidate list 450. The routine loops to step S500.

If it is determined in step S500 that no unprocessed modification candidate selection condition is present in the selected information container frame (i.e., no), a direction having the highest priority is acquired from the selected information container frame in step S506. The routine proceeds to step S508.

In step S508, the acquired direction is determined. If the acquired direction is an upward direction (i.e., top), the routine proceeds to step S510. The CPU 30 deletes a modification candidate container frame that is not outermost in the placement location thereof in the upward direction (namely, deletes a modification candidate container frame having a minimum Y coordinate), from the modification candidate container frames registered in the modification candidate list 450. The routine proceeds to step S512.

The CPU 30 determines in step S512 whether the number of registrations in the modification candidate list 450 is plural or not. If it is determined that the number of registrations in the modification candidate list 450 is singular (i.e., no), the routine proceeds to step S514. The size of the selected information container frame is modified to the modification candidate container frame registered in the modification candidate list 450. The series of process steps is thus completed, and the CPU 30 returns to the original process.

If it is determined in step S512 that the number of registrations in the modification candidate list 450 is plural (i.e., yes), the routine proceeds to step S516. A direction having the second highest priority is acquired from the selected information container frame and the routine proceeds to step S508.

If it is determined in step S508 that the acquired direction is a leftward direction (i.e., left), the routine proceeds to step S518. The CPU 30 deletes a modification candidate container frame that is not outermost in the placement position in the leftward direction (in other words, deletes a modification candidate container frame not having a minimum X coordinate), from the modification candidate container frames registered in the modification candidate list 450. The routine proceeds to step S512.

If it is determined in step S508 that the acquired direction is a downward direction (i.e., bottom), the routine proceeds to step S520. The CPU 30 deletes a modification candidate container frame that is not outermost in the placement position thereof in the downward direction (in other words, deletes a modification candidate container frame not having a maximum Y coordinate), from the modification candidate container frames registered in the modification candidate list 450. The routine proceeds to step S512.

If it is determined in step S508 that the acquired direction is a rightward direction (i.e., right), the routine proceeds to step S522. The CPU 30 deletes a modification candidate container frame that is not outermost in the placement location thereof in the rightward direction (in other words, deletes a modification candidate container frame not having a maximum X coordinate), from the modification candidate container frame registered in the modification candidate list 450. The routine proceeds to step S512.

The placement process to place an article into the information container frame in step S320 will now be discussed with reference to FIG. 19.

Figure 19:
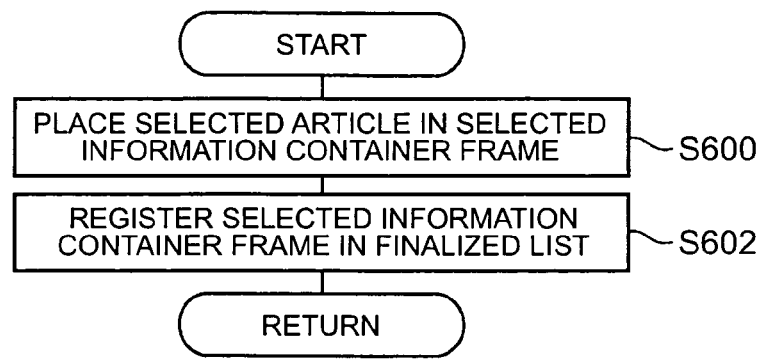
FIG. 19 is a flowchart of a placement process to place an article into an information container frame.

FIG. 19 is a flowchart illustrating the placement process of the article into the information container frame.

In the placement process, a selected article is placed into the selected information container frame. When step S320 is initiated, the placement process starts with step S600, as shown in FIG. 19.

In step S600, the selected article is placed into the selected information container frame. In step S602, the selected information container frame is registered in the finalized list 400. The series of process steps is thus completed, and the CPU 30 returns to the original process.

The operation of the present exemplary embodiment will now be discussed.

An operation to register information required to deliver a digital content will now be discussed.

When a user desires to receive a digital content, the user accesses the content delivery terminal 100 using a WWW browser on the user terminal 200, and then inputs a user registration request.

When the user terminal 200 receives the user registration request, the user terminal 200 requests the user to input required user information in communication with the content delivery terminal 100. In response to the request, the user inputs, as the user information, a main category, a sub-category, a user ID, a password, a destination address, the date of delivery, the time of delivery, a layout number, the maximum number of pages, and a font size. The user information is then sent to the content delivery terminal 100.

Upon receiving the user information in response to the registration request, the content delivery terminal 100 registers the received user information in the user profile table 300 in process steps S100-S114.

The process of delivering a digital content referencing the user profile table 300 is discussed below.

When the content delivery terminal 100 determines that it is the day and time to deliver the digital content, by referencing the user profile table 300, the CPU 30 performs process steps S204 and S206. The CPU 30 therefore reads the category number from the user profile table 300 and searches for digital contents in the content registration DB 44, based on the read category number, thereby retrieving a digital content having a category number matching the read category number. Through process steps S208-S212, the CPU 30 read a layout number from the user profile table 300, and references the layout number correspondence table 330, thereby reading a template application rule, corresponding to the read layout number, from the user information registration DB 40. The CPU 30 determines an output layout for the retrieved digital content based on the read template application rule and produces a digital content to be provided.

A layout process will now be discussed in detail with reference to FIGS. 20 through 33.

In the layout process, the layout area 360 of a top page is set as an object to be processed in steps S300-S304. A page template is read from the template registration DB 42 according to the read template application rule. The read page template is applied to the current layout area 360. In steps S306-S310, the location of a fixed line, the shape and location of fixed text information and the shape and location of fixed image information are determined in that order.

Figure 20:
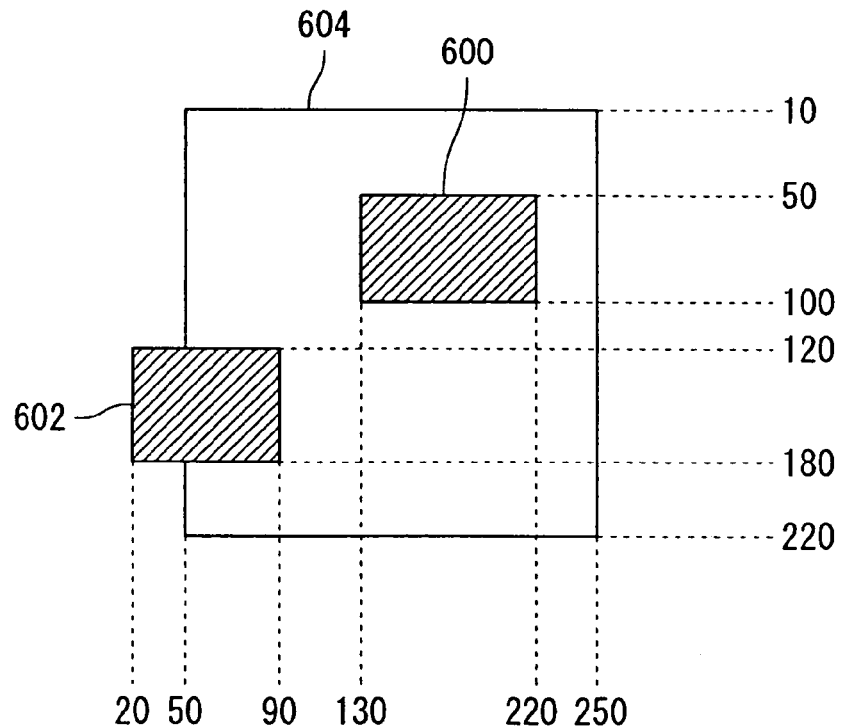
FIG. 20 illustrates a layout state in which information container frames overlap each other.

FIG. 20 illustrates a layout state in which information container frames overlap each other.

As shown, two finalized container frames 600 and 602 overlap with an information container frame 604. The finalized container frame 600 in the entirety thereof overlaps with the upper right portion of the information container frame 604. The finalized container frame 602 in the right half thereof overlaps with the lower left portion of the information container frame 604. The finalized container frames 600 and 602 and the information container frame 604 have respective placement locations of (50, 130, 100, 220), (120, 20, 180, 90), and (10, 50, 220, 250).

When the frames overlap in this way, articles to be placed into the layout area 360 are selected from the digital contents, searched for in step S206, according to the predetermined priority in steps S312 and S214. The information container frame 604 is selected from the current layout area 360.

FIGS. 21A-21D illustrate layout states to segment the information container frame 604.

Figure 21A:
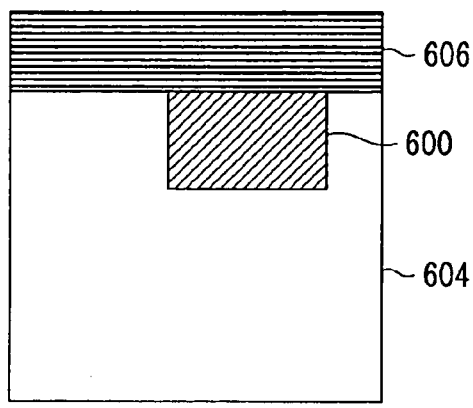
FIGS. 21A-21D illustrate layout states in a segmentation process of an information container frame 604.
Figure 21B:
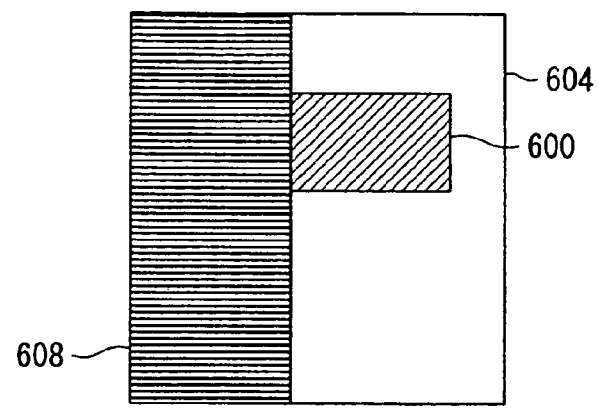
Figure 21C:
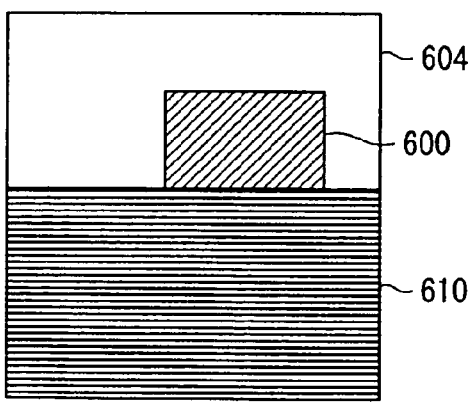
Figure 21D:
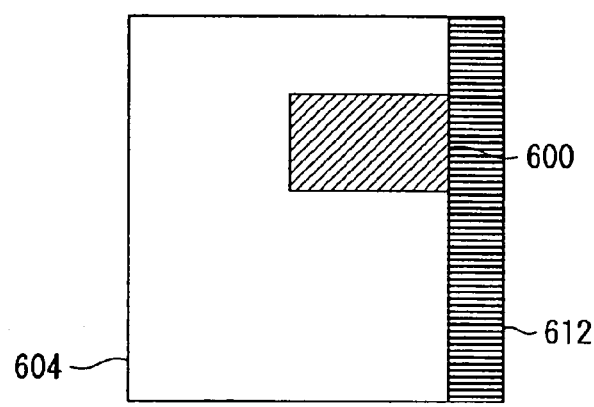

In the layout shown in FIGS. 20A-20D, in steps S400-S404, the selected information container frame 604 is registered into the modification candidate list 450, the finalized container frame 600 is read from the finalized list 400 and the selected information container frame 604 is read from the modification candidate list 450 as a modification candidate container frame. Since the finalized container frame 600 overlaps with the information container frame 604, the modification candidate container frame 604 is segmented into four information container frames 606-612 in step S408 so that the four information container frames 606-612 do not overlap with the finalized container frame 600. More specifically, an upper rectangular portion of the modification candidate container frame 604, above the top side of the finalized container frame 600, is segmented as the information container frame 606, as shown in FIG. 21A. A left rectangular portion of the modification candidate container frame 604 more leftward than the left side of the finalized container frame 600 is segmented as the information container frame 608 as shown in FIG. 21B. A lower rectangular portion of the modification candidate container frame 604, below the bottom side of the finalized container frame 600, is segmented as the information container frame 610, as shown in FIG. 21C. A right rectangular portion of the modification candidate container frame 604, more rightward than the right side of the finalized container frame 600, is segmented as the information container frame 612, as shown in FIG. 21D. The placement locations of the information container frames 606-612 are (10, 50, 50, 250), (10, 50, 220, 130), (100, 50, 220, 250), and (10, 220, 220, 250), respectively. In step S410, the segmented information container frames 606-612, instead of the modification candidate container frame 604, are registered into the modification candidate list 450.

The finalized container frame 602 is registered in the finalized list 400. In steps S416 and S404, the finalized container frame 602 is read from the finalized list 400, and the information container frame 606 is read from the modification candidate list 450 as a modification candidate container frame. Since the finalized container frame 602 does not overlap with the modification candidate container frame 606, the modification candidate container frame 606 is not segmented.

FIGS. 22A-22D illustrate the layout states to segment the information container frame 608.

In steps S412 and S418, the information container frame 608 is read from the modification candidate list 450 as a modification candidate container frame. As shown in FIG. 22A, the finalized container frame 602 overlaps with the modification candidate container frame 608. The modification candidate container frame 608 is segmented into three information container frames 614 through 618 in step S408 not to overlap with the finalized container frame 602. As shown in FIG. 22B, an upper rectangular portion of the information container frame 608, above the top side of the finalized container frame 602, is segmented as the modification candidate container frame 614. As shown in FIG. 22C, a lower rectangular portion of the modification candidate container frame 608 below the bottom side of the finalized container frame 602 is segmented as the information container frame 616. As shown in FIG. 22D, a right rectangular portion of the modification candidate container frame 608, more rightward than the right side of the finalized container frame 602, is segmented as the information container frame 618. The information container frames 614-618 are arranged at respective placement locations (10, 50, 120, 130), (180, 50, 220, 130), and (10, 90, 220, 130). In step S410, the segmented information container frames 614-618, instead of the modification candidate container frame 608, are registered into the modification candidate list 450.

FIGS. 23A-23D illustrate layout states taken in the segmentation of the information container frame 610.

In steps S412 and 418, the information container frame 610 is read from the modification candidate list 450 as a modification candidate container frame. Referring to FIG. 23A, the finalized container frame 602 overlaps with the modification candidate container frame 610. In step S408, the modification candidate container frame 610 is segmented into three information container frames 620-624 not to overlap with the finalized container frame 602. Specifically, an upper rectangular portion of the modification candidate container frame 610, above the top side of the finalized container frame 602, is segmented as the information container frame 620, as shown in FIG. 23B. As shown in FIG. 23C, a lower rectangular portion of the modification candidate container frame 610, below the bottom side of the finalized container frame 602, is segmented as the information container frame 622. As shown in FIG. 23D, a right rectangular portion of the modification candidate container frame 610, more rightward than the right side of the finalized container frame 602, is segmented as the information container frame 624. The information container frames 620-624 are arranged at respective placement locations (100, 50, 120, 250), (180, 50, 220, 250), and (100, 90, 220, 250). In step S410, the segmented information container frames 620-624, instead of the modification candidate container frame 610, are registered into the modification candidate list 450.

In steps S412 and S418, the information container frame 612 is read from the modification candidate list 450 as a modification candidate container frame. Since the finalized container frame 602 does not overlap with the modification candidate container frame 612, the modification candidate container frame 612 is not segmented.

FIG. 24 illustrates the data structure of the modification candidate list 450.

The segmentation process with respect to the finalized container frames 600 and 602 is performed. When the end of the modification candidate list 450 is reached, a modification candidate list production process in step S316 is completed.

As shown in FIG. 24, registered in the modification candidate list 450 as a result, are the placement locations, the widths, the heights, and the areas of the modification candidate container frames 606, 614, 616, 618, 620, 622, 624, and 612. Referring to FIG. 24, records ID1-ID8 respectively correspond to the modification candidate container frames 606, 614, 616, 618, 620, 622, 624, and 612.

An operation of selecting one frame from the modification candidate list 450 is discussed below.

Discussed next in detail with reference to FIGS. 25 through 27 is the case in which no modification candidate selection conditions are set to the selected information container frame 604, and the upward direction, the leftward direction, and the downward direction are prioritized in that order as the modification candidate selection method.

FIGS. 25 through 27 illustrate the data structure of the modification candidate list 450.

In steps S506 and S510, the upward direction (i.e., top) is acquired from the selected information container frame 604 as the highest priority direction. Any modification candidate container frame that is not outermost in the placement location thereof in the upward direction is deleted from the modification candidate container frames registered in the modification candidate list 450. More specifically, since the Y coordinates of the top sides of the modification candidate container frames 606, 614, 616, and 612 are a minimum of "10", the modification candidate container frames 618, 620, 622, and 624 are deleted from the modification candidate list 450. As a result, four records remain in the modification candidate list 450, as shown in FIG. 25.

In steps S516 and S518, the leftward direction (i.e., left) is acquired from the information container frame 604 as the second highest priority direction. Any modification candidate container frame that is not outermost in the placement location thereof in the leftward direction is deleted from the modification candidate container frames registered in the modification candidate list 450. Specifically, since the X coordinates of the left sides of the modification candidate container frames 606 and 614 are a minimum of "50", the modification candidate container frames 616 and 612 are deleted from the modification candidate list 450. As a result, two records remain in the modification candidate list 450, as shown in FIG. 26.

In steps S516 and S520, the lower direction (i.e., bottom) is acquired from the information container frame 604 as the next highest priority direction. Any modification candidate container frame that is not outermost in the placement location thereof in the lower direction is deleted from the modification candidate container frames registered in the modification candidate list 450. Specifically, since the Y coordinate of the bottom side of the modification candidate container frame 614 is a maximum of "120", the modification container frame 606 is deleted from the modification candidate list 450. As a result, a single record remains in the modification candidate list 450, as shown in FIG. 27.

Now that the one record remains in the modification candidate list 450, the selected information container frame 604 is modified in size to the modification container frame 614, the selected article is placed into the selected information container frame 604, and the selected information container frame 604 is registered into the finalized list 400 in steps S514, S600, and S602.

Discussed next with reference to FIGS. 28 and 29 is the case in which no modification candidate selection conditions are set to the selected information container frame 604, and the upward direction, the downward direction, and the leftward direction are prioritized in that order as the modification candidate selection method.

FIGS. 28 and 29 illustrate the data structure of the modification candidate list 450.

In steps S506 and S510, the upward direction (i.e., top) is acquired from the selected information container frame 604 as the highest priority direction. Any modification candidate container frame that is not outermost in the placement location thereof in the upward direction is deleted from the modification candidate container frames registered in the modification candidate list 450. Specifically, since the Y coordinates of the top sides of the modification candidate container frames 606, 614, 616, and 612 are a minimum of "10", the modification candidate container frames 618, 620, 622, and 624 are deleted from the modification candidate list 450.

In steps S516 and S520, the downward direction (i.e., bottom) is acquired from the selected information container frame 604 as the second highest priority direction. Any modification candidate container frame that is not outermost in the placement location thereof in the downward direction is deleted from the modification candidate container frames registered in the modification candidate list 450. Specifically, since the Y coordinates of the bottom sides of the modification candidate container frames 616 and 612 are a maximum of "220", the modification candidate container frames 606 and 614 are deleted from the modification candidate list 450. As a result, two records remain in the modification candidate list 450 as shown in FIG. 28.

In steps S516 and S518, the leftward direction (i.e., left) is acquired from the selected information container frame 604 as the next highest priority direction. Any modification candidate container frame that is not outermost in the placement location thereof in the leftward direction is deleted from the modification candidate container frames registered in the modification candidate list 450. Specifically, since the X coordinate of the left side of the modification candidate container frame 616 is a minimum of "90", the modification candidate container frame 612 is deleted from the modification candidate list 450. As a result, a single record remains in the modification candidate list 450, as shown in FIG. 29.

Now that the one record remains in the modification candidate list 450, the selected information container frame 604 is modified in size to the modification candidate container frame 616, the selected article is placed into the selected information container frame 604 and the selected information container frame 604 is registered in the finalized list 400 in steps S514, S600 and S602.

Discussed next with reference to FIGS. 30 through 33 is the case in which the minimum width selection condition, the minimum height selection condition and the maximum area selection condition are set as the modification candidate selection conditions. The leftward direction, the rightward direction and the upward direction are prioritized in that order as the modification candidate selection method. The minimum width selection condition is "min-width=40", the minimum height selection condition is "min-height=40", and the maximum area selection condition is "max-area=10000".

FIGS. 30 through 33 illustrate the data structure of the modification candidate list 450.

By repeating steps S500-S504, the modification candidate selection condition is acquired from the selected information container frame 604 and the modification candidate container frames not satisfying the acquired modification candidate selection condition are deleted from the modification candidate list 450. Specifically, the width of the modification candidate container frame 612 is less than 40. The modification candidate container frame 612 is deleted from the modification candidate list 450 according to the minimum width selection condition. Since the height of the modification candidate container frame 620 is less than 40, the modification candidate container frame 620 is deleted from the modification candidate list 450 according to the minimum height selection condition. Since the area of the modification candidate container frame 624 is larger than 10000, the modification candidate container frame 624 is deleted from the modification candidate list 450 according to the maximum area selection condition. As a result, five records remain in the modification candidate list 450, as shown in FIG. 30.

In steps S506 and S518, the leftward direction (i.e., left) is acquired from the selected information container frame 604 as the highest priority direction. A modification candidate container frame, that is not outermost in the placement position thereof in the leftward direction, is deleted from the modification candidate container frames registered in the modification candidate list 450. Specifically, since the X coordinates of the left sides of the modification candidate container frames 606, 614, 618, and 622 are a minimum of "50", the modification candidate container frame 616 is deleted from the modification candidate list 450. As a result, four records remain in the modification candidate list 450, as shown in FIG. 31.

In steps S561 and S522, the rightward direction (i.e., right) is acquired from the selected information container frame 604 as the next highest priority direction, and a modification candidate container frame that is not outermost in the placement location thereof in the rightward direction is deleted from the modification candidate container frames registered in the modification candidate list 450. Specifically, since the X coordinates of the right sides of the modification candidate container frames 606 and 622 are a maximum of "250", the modification candidate container frames 614 and 618 are deleted from the modification candidate list 450. As a result, two records remain in the modification candidate list 450, as shown in FIG. 32.

In steps S516 and S510, the upward direction (i.e., top) is acquired from the selected information container frame 604 as the next highest priority direction. A modification candidate container frame that is not outermost in the placement location thereof in the upward direction is deleted from the modification candidate container frames registered in the modification candidate list 450. More specifically, since the Y coordinate of the top side of the modification candidate container frame 606 is a minimum of "10", the modification candidate container frame 622 is deleted from the modification candidate list 450. As a result, a single record remains in the modification candidate list 450, as shown in FIG. 33.

Now that the single record remains in the modification candidate list 450, the selected information container frame 604 is modified in size to the modification candidate container frame 606, the selected article is placed into the selected information container frame 604, and the selected information container frame 604 is registered into the finalized list 400 in steps S514, S600, and S602.

Articles are arranged in the layout areas 360 of all pages and the output layouts of the digital contents are determined. In steps S222 and S224, the destination address is read from the user profile table 300, and the produced digital content is delivered to the read destination address.

When a plurality of information container frames overlap each other, the content delivery terminal 100 modifies the size of one information container frame with the rectangular shape thereof maintained not to overlap with the other information container frames.

The information container frame is modified in size with the rectangular shape thereof maintained regardless of the content of the article, the amount of information of the article, and the logical structure of the article. In comparison with the related art, the present exemplary embodiment reduces the possibility that the layout intended by a designer is destroyed as a result of the deformation of an image or the development of blanks.

In accordance with the present exemplary embodiment, the content delivery terminal 100 segments the selected information container frame into information container frames not overlapping the other information container frame, registers the segmented information container frames into the modification candidate list, selects one of the modification candidate container frames in the modification candidate list, and modifies the selected information container frame in size to the selected modification candidate container frame.

In this way, the selected information container frame is relatively reliably modified with the rectangular shape thereof maintained. The possibility that the layout intended by the designer is destroyed is further reduced.

In accordance with the present exemplary embodiment, the content delivery terminal 100 sets priority on at least three directions among the vertically upward and downward directions, and the horizontally rightward and leftward directions in the placement location of the information container frame, and selects the information container frame that is outermost in the placement location thereof in the direction determined based on the priority, among the information container frames registered in the modification candidate list.

The manner of modifying the selected information container frame is defined by the setting of the priority. If the priority reflecting the intention of the designer is set, the possibility of the destruction of the layout intended by the designer is even further reduced.

In accordance with the present exemplary embodiment, the content delivery terminal 100 selects one of the modification candidate container frames from the modification candidate list according to the modification candidate selection condition.

The modification candidate selection condition can be designated. If the modification candidate selection condition is designated in accordance with the intention of the designer, the possibility of the destruction of the layout intended by the designer is further reduced.

In accordance with the present exemplary embodiment, the modification candidate selection conditions include the minimum area selection condition to select a modification candidate container frame, having an area equal to or larger than the predetermined area, from the modification candidate list.

When the designer intends to produce a layout that is constructed using the modification candidate container frame having the area equal to or larger than the predetermined area, the present exemplary embodiment provides a layout relatively faithfully reflecting the designer's intention. The present exemplary embodiment even further reduces the possibility that the layout intended by the designer is destroyed. Since the modification candidate container frame having the area equal to or larger than the predetermined area is selected, the possibility that blanks develop in the layout area is reduced. A relatively aesthetically appealing layout is thus provided.

In accordance with the present exemplary embodiment, the modification candidate selection conditions include the maximum area selection condition to select a modification candidate container frame, having an area equal to or smaller than a predetermined area, from the modification candidate list.

When the designer intends to produce a layout that is constructed using the modification candidate container frame having the area equal to or larger than the predetermined area, the present exemplary embodiment provides a layout relatively faithfully reflecting the designer's desire. The present exemplary embodiment even further reduces the possibility that the layout intended by the designer is destroyed.

In accordance with the present exemplary embodiment, the modification candidate selection conditions include the minimum width selection condition to select a modification candidate container frame, having a width equal to or wider than a predetermined width, from the modification candidate list.

When the designer intends to produce a layout that is constructed using the modification candidate container frame having the width equal to or wider than the predetermined width, the present exemplary embodiment provides a layout relatively faithfully reflecting the designer's desire. The possibility that the layout intended by the designer is destroyed is even further reduced.

In accordance with the present exemplary embodiment, the modification candidate selection conditions include the maximum width selection condition to select a modification candidate container frame, having a width equal to or narrower than a predetermined width, from the modification candidate list.

When the designer intends to produce a layout that is constructed using the modification candidate container frame having the width equal to or narrower than the predetermined width, the present exemplary embodiment provides a layout relatively faithfully reflecting the designer's desire. The possibility that the layout intended by the designer is destroyed is even further reduced.

In accordance with the present exemplary embodiment, the modification candidate selection conditions include the minimum height selection condition to select a modification candidate container frame, having a height equal to or higher than a predetermined height, from the modification candidate list.

When the designer intends to produce a layout that is constructed using the modification candidate container frame having the height equal to or higher than the predetermined height, the present exemplary embodiment provides a layout relatively faithfully reflecting the designer's desire. The possibility that the layout intended by the designer is destroyed is even further reduced.

In accordance with the present exemplary embodiment, the modification candidate selection conditions include the maximum height selection condition to select a modification candidate container frame, having a height equal to or lower than a predetermined height, from the modification candidate list.

When the designer intends to produce a layout that is constructed using the modification candidate container frame having the height equal to or lower than the predetermined height, the present exemplary embodiment provides a layout relatively faithfully reflecting the designer's desire. The possibility that the layout intended by the designer is destroyed is even further reduced.

In accordance with the present exemplary embodiment, the content delivery terminal 100 searches for and retrieves a digital content from the content registration DB 44 based on the user information in the user information registration DB 40.

Since the information unique to the user and the information designated by the user are referenced in the selection of the digital content, the available digital content having the content relatively faithfully reflecting the user's desire is thus produced.

In accordance with the present exemplary embodiment, the content delivery terminal 100 produces an available digital content by determining an output layout of the digital content based on the user information in the user information registration DB 40.

Since the information unique to the user and the information designated by the user are referenced in the determination of the digital content, the available digital content relatively faithfully reflecting the user's desire is thus produced.

In accordance with the above exemplary embodiment, text information and image information are used as article information. The present invention is not limited to these pieces of information. Alternatively, moving picture information, voice information, and multi-media data may also be used as the article information.

In accordance with the above exemplary embodiment, the finalized list 400 and the modification candidate list 450 are stored in the template registration DB 42. The present invention is not limited to this arrangement. The finalized list 400 and the modification candidate list 450 may be stored onto the RAM 34 in the middle of the automatic layout process.

In accordance with the above exemplary embodiment, at least three directions of the vertically upward and downward directions and the horizontally leftward and rightward directions are prioritized in the placement location of the information container frame. An information container frame that is outermost in the placement location thereof in the direction having the priority is selected from the information container frames registered in the modification candidate list. The present invention is not limited to this method. Alternatively, an information container frame that has the largest area may be selected from the information container frames registered in the modification candidate list. In this method, the information container frame (100, 90, 220, 550) having an area of 19200 is selected from the modification candidate list of FIG. 24.

Since the modification candidate container frame having the largest area is selected, it becomes less likely that blanks are developed in the layout area. A relatively aesthetically appealing layout is thus provided.

In accordance with the present exemplary embodiment, the layout process is performed while the shape and location of the information container frame are dynamically determined. The present invention is not limited to this method. Alternatively, information may be placed into all information container frames in the layout area 360 before the shape and location of each information container frame are determined in the layout process.

In accordance with the present exemplary embodiment, the output layout of the digital content is determined based on the user information. The present invention is not limited to this method. Alternatively, the output layout of the digital content may be determined based on the number of images contained in the digital content or the amount of text information contained in the digital content.

Regardless of the number of images contained in the digital content and the amount of text information contained in the digital content, an output layout relatively easy to see is provided.

In accordance with the present exemplary embodiment, the content delivery terminal 100 performs the layout process in step S212. The present invention is not limited to this method. Alternatively, the user terminal 200 may perform the layout process. This arrangement reduces the concentration of workload on the content delivery terminal 100.

In accordance with the present exemplary embodiment, the processes of the flowcharts illustrated in FIGS. 14 through 19 are performed by executing the control program stored in the ROM 32. The present invention is not limited to this arrangement. A program describing the processes may be read from a storage medium to the RAM 34 before performing the processes.

The storage medium may be a semiconductor storage medium, such as an RAM, an ROM, etc., a magnetic storage medium, such as an FD, an HD, etc., an optical storage medium, such as a CD, a CDV, an LD, a DVD, etc., or magnetic recording/optical reading type storage medium, such as an MO, etc. The storage medium is thus any computer readable storage medium that permits data to be read electrically, mechanically, or optically.

In accordance with the above exemplary embodiment of the present invention, the layout system, the layout program, and the layout method are implemented in a network system including the Internet 199. The present invention is not limited to this arrangement. Alternatively, the present invention may be applied to a so-called intranet that performs the same communication as that of the Internet 199. The present invention is not limited to a network that performs the same communication method as that of the Internet 199, and may be applied to an ordinary network.

The layout system, the layout program, and the layout method in accordance with the above-referenced exemplary embodiment of the present invention are applied to the system in which the content delivery terminal 100 delivers the digital content, such as news, to the user terminal 200 as shown in FIG. 1. The present invention is not limited to such a system. The layout system, the layout program and the layout method may be applied to another system without departing from the scope of the present invention.

Mutually overlapping information container frames may be not rectangular but elliptic. If it is not necessary to determine precise overlapping locations of the frames, the workload involved in the shape changing process of an elliptical container frame 630 is reduced by considering the elliptical information container frame 630 as a virtually rectangular information container frame 632 circumscribing (or inscribing) the information container frame 630. Specifically, to expand or contract the circular container frame 630 in a vertical direction from the state thereof illustrated in FIG. 34A, to the state thereof illustrated in FIG. 34B, the rectangular information container frame 632 may be expanded or contracted in a vertical direction, as shown in FIG. 34B. To expand or contract the circular container frame 630 in a horizontal direction, the rectangular information container frame 632 may be expanded or contracted in a horizontal direction, as shown in FIG. 34C. To similarly expand or contract the circular information container frame 630, the rectangular information container frame 632 may be similarly expanded and contracted, as shown in FIG. 34D. To expand or contract the elliptical information container frame 630 to any size, the expansion process or contraction process shown in FIGS. 34A and 34B may be combined.

What is claimed is:

1. A layout method, comprising:
   a layout step to lay out information to be posted, the layout step including placing the information in a plurality of information container frames arranged in a predetermined layout area,
   if the plurality of information container frames overlap each other, the size of one of the information container frames is modified in the layout step with the geometrical shape thereof maintained so that none of the information container frames overlaps each other, and
   a modification candidate list storage step to store a modification candidate list of a plurality of modification candidates of information container frames subsequent to the modification,
   the layout step including a segmentation frame selecting step to select, as an information container frame to be segmented, one of the plurality of information container frames overlapping each other, an information container frame segmenting step to segment the one information container frame selected by the segmentation frame selecting step into a plurality of information container frames that do not overlap with another one of the plurality of originally overlapping information container frames, a modification candidate registering step to register the information container frames, segmented by the information container frame segmenting step, in the modification candidate list, a modification candidate selecting step to select a modification candidate from the modification candidate list, and an information container frame modifying step to modify the size of the information container frame to be segmented, selected by the segmentation frame selecting step, to the information container frame selected by the modification candidate selecting step.

2. A layout method, comprising:
   a layout step to lay out information to be posted, the layout step including placing the information in a plurality of information container frames arranged in a predetermined layout area,
   if it is determined in the layout step that the plurality of information container frames overlap each other, the size of one of overlapping information container frames is modified in the layout step with the geometrical shape thereof maintained so that none of the information container frames overlaps each other, and
   a modification candidate list storage step to store a modification candidate list of a plurality of modification candidates of information container frames subsequent to the modification,
   the layout step including a segmentation frame selecting step to select, as an information container frame to be segmented, one of the plurality of information container frames overlapping each other, an information container frame segmenting step to segment the one information container frame selected by the segmentation frame selecting step into a plurality of rectangular information container frames that do not overlap with another one of the plurality of originally overlapping information container frames, a modification candidate registering device step to register the information container frames, segmented by the information container frame segmenting step, in the modification candidate list, a modification candidate selecting step to select a modification candidate from the modification candidate list, and an information container frame modifying step to modify the size of the information container frame to be segmented, selected by the segmentation frame selecting step, to the information container frame selected by the modification candidate selecting step.

* * * * *